(12) United States Patent
Bzowej et al.

(10) Patent No.: US 11,286,408 B2
(45) Date of Patent: Mar. 29, 2022

(54) POLYURETHANE ADHESIVE LAYERS FOR ELECTRO-OPTIC ASSEMBLIES

(71) Applicant: E INK CORPORATION, Billerica, MA (US)

(72) Inventors: Eugene Bzowej, Reading, MA (US); David Darrell Miller, Wakefield, MA (US); Ziyan Wu, Wayland, MA (US)

(73) Assignee: E Ink Corporation, Billerica, MA (US)

( * ) Notice: Subject to any disclaimer, the term of this patent is extended or adjusted under 35 U.S.C. 154(b) by 225 days.

(21) Appl. No.: 16/851,238

(22) Filed: Apr. 17, 2020

(65) Prior Publication Data

US 2020/0248054 A1 Aug. 6, 2020

Related U.S. Application Data

(63) Continuation of application No. 16/199,391, filed on Nov. 26, 2018, now Pat. No. 10,662,354, which is a
(Continued)

(51) Int. Cl.
| | |
|---|---|
| *G02B 26/00* | (2006.01) |
| *C09J 175/08* | (2006.01) |
| *C08G 18/66* | (2006.01) |
| *C08G 18/08* | (2006.01) |
| *C08G 18/12* | (2006.01) |
| *C08G 18/28* | (2006.01) |

(Continued)

(52) U.S. Cl.
CPC ........ *C09J 175/08* (2013.01); *C08G 18/0823* (2013.01); *C08G 18/0833* (2013.01); *C08G 18/12* (2013.01); *C08G 18/289* (2013.01); *C08G 18/3206* (2013.01); *C08G 18/348* (2013.01); *C08G 18/4825* (2013.01); *C08G 18/6692* (2013.01); *C08G 18/758* (2013.01); *C09J 175/12* (2013.01); *G02F 1/167* (2013.01); *G02F 1/1675* (2019.01); *G02F 2202/28* (2013.01)

(58) Field of Classification Search
CPC ....................... C08G 18/0823; C08G 18/0833; C08G 18/12; C08G 18/289; C08G 18/3206; C08G 18/348; C08G 18/4825; C08G 18/6692; C08G 18/758; C08G 18/48; C09J 7/00; C09J 175/08; C09J 175/12; G02F 1/167; G02F 1/1675; G02F 2202/28
USPC .................................. 359/245–279, 315–32
See application file for complete search history.

(56) References Cited

U.S. PATENT DOCUMENTS

| | | |
|---|---|---|
| 3,718,622 A | 2/1973 | Camilleri et al. |
| 4,071,505 A | 1/1978 | Meckel et al. |

(Continued)

OTHER PUBLICATIONS

Wood, D., "An Electrochromic Renaissance?" Information Display, 18(3), 24 (Mar. 2002).

(Continued)

*Primary Examiner* — Mahidere S Sahle
(74) *Attorney, Agent, or Firm* — Ioannis Constantinides

(57) ABSTRACT

Electro-optic assemblies and related materials (e.g., adhesive) for use therein are generally provided. The electro-optic assembly comprises a hybrid adhesive layer comprising two or more adhesive materials including a polyurethane adhesive material and a polyacrylate adhesive material. The polyurethane adhesive material includes an end-capping cyclic carbonate. In some embodiments, the adhesive layer is formed by curing the two adhesive materials under two different sets of conditions, comprising two or more curing steps.

20 Claims, 23 Drawing Sheets

Related U.S. Application Data continuation of application No. 15/279,829, filed on Sep. 29, 2016, now Pat. No. 10,174,232.

(60) Provisional application No. 62/235,580, filed on Oct. 1, 2015, provisional application No. 62/235,480, filed on Sep. 30, 2015.

(51) Int. Cl.
*C08G 18/32* (2006.01)
*C09J 175/12* (2006.01)
*C08G 18/34* (2006.01)
*C08G 18/48* (2006.01)
*C08G 18/75* (2006.01)
*G02F 1/1675* (2019.01)
*G02F 1/167* (2019.01)

(56) References Cited

U.S. PATENT DOCUMENTS

| | | | |
|---|---|---|---|
| 4,418,346 A | 11/1983 | Batchelder | |
| 4,501,852 A | 2/1985 | Markusch et al. | |
| 4,579,899 A | 4/1986 | Kondo | |
| 4,618,651 A | 10/1986 | Gilch et al. | |
| 5,637,639 A | 1/1997 | Duan et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 6,054,071 A | 4/2000 | Mikkelsen, Jr. | |
| 6,055,091 A | 4/2000 | Sheridon et al. | |
| 6,097,531 A | 8/2000 | Sheridon | |
| 6,128,124 A | 10/2000 | Silverman | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,184,856 B1 | 2/2001 | Gordon, II et al. | |
| 6,225,971 B1 | 5/2001 | Gordon, II et al. | |
| 6,241,921 B1 | 6/2001 | Jacobson et al. | |
| 6,271,823 B1 | 8/2001 | Gordon, II et al. | |
| 6,301,038 B1 | 10/2001 | Fitzmaurice et al. | |
| 6,433,996 B1 | 8/2002 | Hata et al. | |
| 6,576,372 B1 | 6/2003 | Hata et al. | |
| 6,672,921 B1 | 1/2004 | Liang et al. | |
| 6,788,449 B2 | 9/2004 | Liang et al. | |
| 6,866,760 B2 | 3/2005 | Paolini, Jr. et al. | |
| 6,870,657 B1 | 3/2005 | Fitzmaurice et al. | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 6,989,429 B2 | 1/2006 | Feng | |
| 7,002,728 B2 | 2/2006 | Pullen et al. | |
| 7,012,735 B2 | 3/2006 | Honeyman | |
| 7,075,502 B1 | 7/2006 | Drzaic et al. | |
| 7,116,318 B2 | 10/2006 | Amundson et al. | |
| 7,170,670 B2 | 1/2007 | Webber | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,339,715 B2 | 3/2008 | Webber et al. | |
| 7,342,068 B2 | 3/2008 | Klingenberg et al. | |
| 7,411,719 B2 | 8/2008 | Paolini, Jr. et al. | |
| 7,420,549 B2 | 9/2008 | Jacobson et al. | |
| 7,477,444 B2 | 1/2009 | Cao et al. | |
| 7,535,624 B2 | 5/2009 | Amundson et al. | |
| 7,679,814 B2 | 3/2010 | Paolini, Jr. et al. | |
| 7,839,564 B2 | 11/2010 | Whitesides et al. | |
| 7,986,450 B2 | 7/2011 | Cao et al. | |
| 8,009,348 B2 | 8/2011 | Zehner et al. | |
| 8,319,759 B2 | 11/2012 | Jacobson et al. | |
| 9,260,564 B2 | 2/2016 | Lombardo et al. | |
| 9,309,218 B2 | 4/2016 | Woelfle et al. | |
| 9,556,304 B2 | 1/2017 | Laas et al. | |
| 2011/0306724 A1 | 12/2011 | Campbell et al. | |
| 2015/0259470 A1 | 9/2015 | Michaud et al. | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office; PCT/US2016/054336; International Search Report and Written Opinion; dated Jan. 12, 2017.

European Patent Office, EP Appl. No. 16852557.4, Extended European Search Report, dated Oct. 16, 2018.

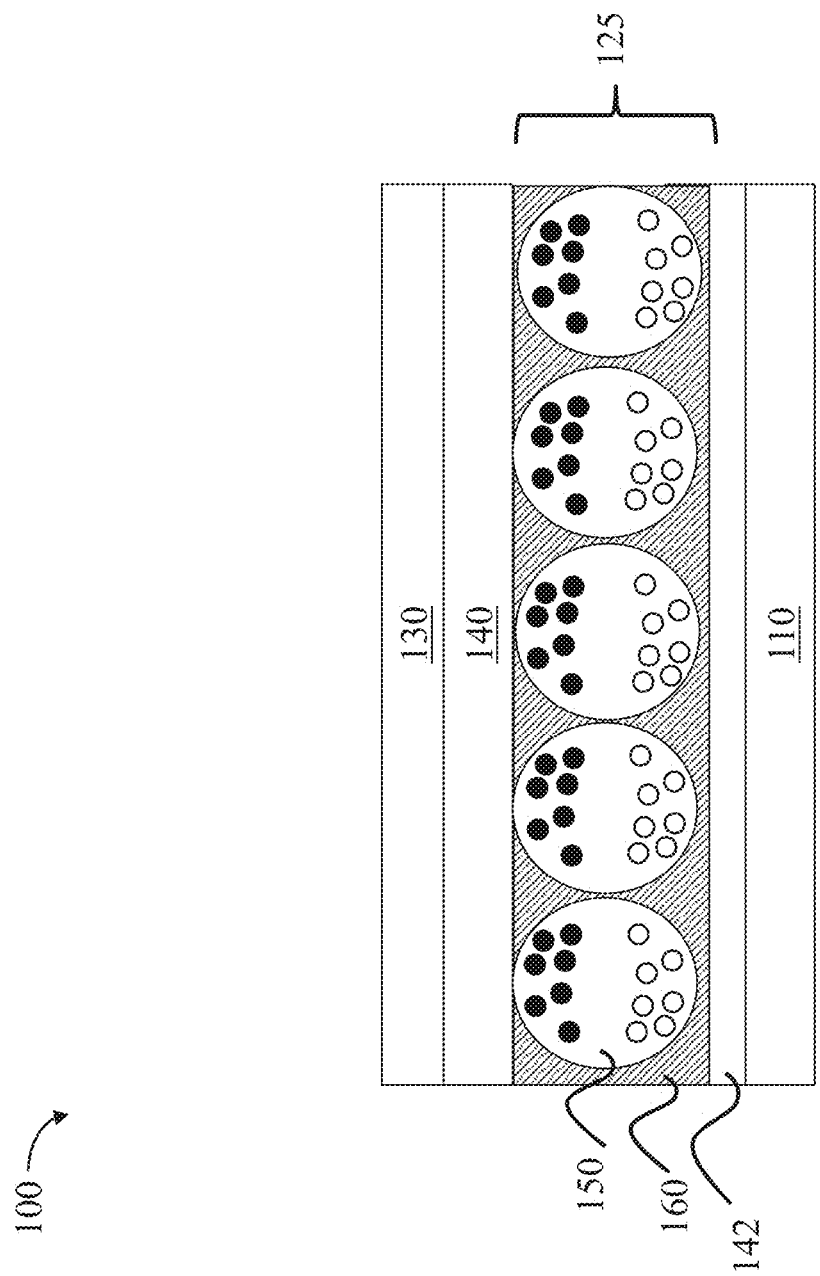

POLYURETHANE ADHESIVE LAYERS FOR ELECTRO-OPTIC ASSEMBLIES

REFERENCE TO RELATED APPLICATIONS

This application is a continuation of U.S. patent application Ser. No. 16/199,391, filed on Nov. 26, 2018, which is a continuation of U.S. patent application Ser. No. 15/279,829, filed on Sep. 29, 2016, which claims priority to U.S. Application Ser. No. 62/235,480, filed Sep. 30, 2015 and U.S. Application Ser. No. 62/235,580, filed Oct. 1, 2015. The entire contents of these applications, as well as all other patents and published applications mentioned below, are herein incorporated by reference in their entireties.

BACKGROUND

Polyurethanes find uses in a wide variety of applications, for example, for use as adhesives. The adhesives may be utilized in electro-optic assemblies, wherein the electro-optic assemblies generally comprise a plurality of functional layers and can be used to form displays such as electrophoretic displays. Such assemblies may include a layer of electro-optic material, a front plane and a backplane. Electro-optic materials generally have at least two display states differing in at least one optical property (e.g., optical transmission, reflectance, luminescence) when different electric fields are applied to the material. Electro-optic displays can have attributes of good brightness and contrast, wide viewing angles, state bistablility, and low power consumption.

In some instances, electro-optic assemblies utilize an adhesive to adhere different layers together (e.g., the electro-optic material layer to the front plane and/or the backplane). Such adhesives are generally known in the art and may comprise, for example, hot-melt type adhesives and/or wet-coat adhesives, such as polyurethane-based adhesives. Adhesives generally require good strength of adhesion, while having certain properties (e.g., electrical properties, mechanical properties, thermal properties) that do not hinder the operation of the electro-optic display. However, there remains a need for adhesives with improved properties.

SUMMARY

The invention is a polyurethane adhesive material for use in electro-optic assemblies. The polyurethane adhesives typically include at least an end-capping cyclic carbonate group, however, they may include additional functional elements and/or crosslinkers. In some embodiments, the adhesive is formed by two or more curing steps. Each curing step may comprise, for example, crosslinking of the adhesive, thermoplastic drying of the adhesive, end-capping the adhesive, chain-extending the adhesive, and/or combinations thereof such that the adhesive undergoes at least one cure in each curing step.

In one aspect, polyurethane adhesive layers are disclosed for the use in electro-optic assemblies. In some embodiments, the polyurethane a cyclic carbonate end-capping group. In some embodiments, the adhesive comprises polyurethane and acrylic functional groups. In some embodiments, the adhesive comprises a first reactive functional group, and a second reactive functional group, wherein at least one of the reactive functional groups has a dipole moment of greater than about 2 Debyes.

Other aspects and various non-limiting embodiments of the invention are described in the following detailed description. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

Various aspects and embodiments of the application will be described with reference to the following figures. It should be appreciated that the figures are not necessarily drawn to scale.

FIGS. 1A-1E are schematic illustrations of electro-optic assemblies comprising an adhesive layer.

FIG. 7 suggests an optimal range of cyclic carbonate to reduce 30 s WS L* drift.

Figure 1A:
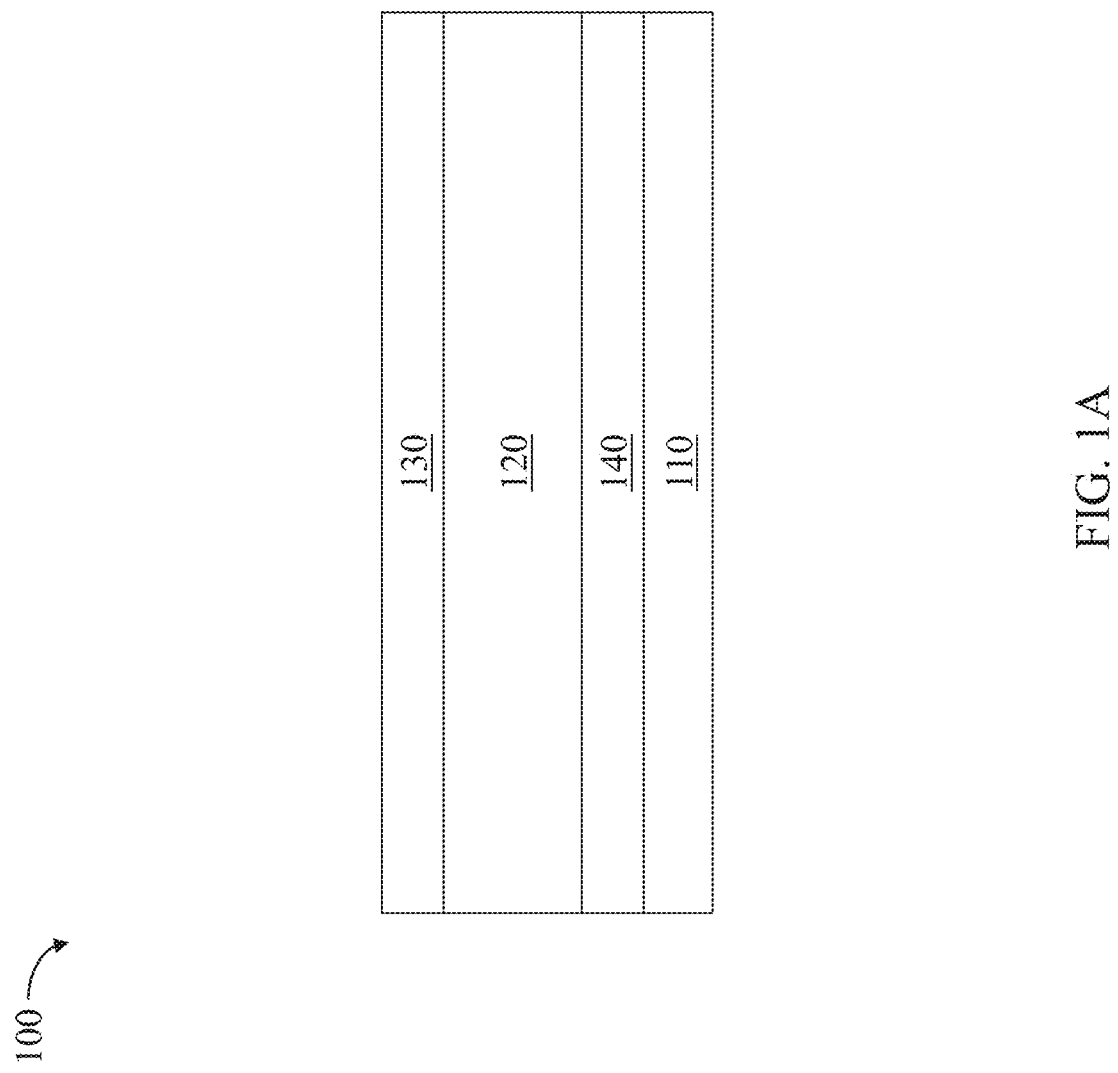

Other aspects, embodiments and features of the invention will become apparent from the following detailed description when considered in conjunction with the accompanying drawings.

DETAILED DESCRIPTION

The invention includes a new class of polyurethane adhesive layers that are well-suited for incorporation into electro-optic assemblies, for example, encapsulated electrophoretic displays. The polyurethane adhesives typically include at least a cyclic carbonate group, however, they may include additional functional elements and/or crosslinkers. In some embodiments, the adhesive is formed by two or more curing steps. Each curing step may comprise, for example, crosslinking of the adhesive, thermoplastic drying of the adhesive, end-capping the adhesive, chain-extending the adhesive, and/or combinations thereof such that the adhesive undergoes at least one cure in each curing step.

The adhesive may comprise at least one type of end-capping reagent and/or at least one type of chain-extending reagent. In certain embodiments, the adhesive comprises two or more reactive functional groups (e.g., reactive functional groups configured to react with one or more curing species such that, for example, at least one of the two or more reactive functional groups forms a cured moiety such as a crosslink). The adhesive, in some cases, comprises an acrylic. In certain embodiments, the adhesive is a hybrid adhesive comprising two or more types of adhesive materials (e.g., a hybrid adhesive comprising a polyurethane and an acrylic). In some embodiments, the adhesive is formed by the curing of two or more adhesive materials under two different sets of conditions. For example, in an exemplary embodiment, the adhesive comprises an acrylic cured via thermoplastic drying and a polyurethane cured via reaction with the acrylic (e.g., via crosslinking with the acrylic).

Methods for forming adhesives and adhesive layers are also generally provided. In some embodiments, the method comprises curing an adhesive by reacting one or more reactive functional groups with one or more curing species (e.g., reacting the adhesive with a first curing species and, subsequently, reacting the adhesive with a second curing species). For example, curing the adhesive may comprise crosslinking the adhesive by reacting one or more reactive functional groups with a curing species such as a crosslinking reagent. Reactive functional groups and types of curing species are described in more detail, herein. In some cases, curing the adhesive may comprise crosslinking of the adhesive, thermoplastic drying of the adhesive, end-capping the adhesive, chain-extending the adhesive, and/or combinations thereof. In certain embodiments, curing the adhesive comprises a first curing step and a second curing step (e.g., wherein each curing step comprises reacting a reactive functional group with one or more curing species). In some cases, a substrate (e.g., a release layer, an electro-optic layer) is adhered to the adhesive after the first curing step and before the second curing step.

The adhesives may be useful in a number of applications, including, but not limited to, materials for use in electro-optic assemblies (e.g., as adhesive layers). The electro-optic assemblies may form an electro-optic display such as an electrophoretic display. As described above, electro-optic assemblies generally comprise a plurality of functional layers including, but not limited to, a front plane electrode (e.g., which may comprise a polymeric film coated with a conductive material), a backplane electrode (e.g., which may comprise an electrode, circuitry, and/or a support layer) and an electro-optic material layer. The electro-optic material layer can comprise an electro-optic material having first and second display states differing in at least one optical property (e.g., optical transmission, reflectance, luminescence), the material being changed from its first to its second display state by application of an electric field to the material. For example, in some electrophoretic displays, the electro-optic material layer may include a plurality of capsules that are distributed in a binder. The capsules can include a clear fluid in which electrically-charged ink particles (e.g., black and white ink particles) are suspended. The ink particles translate within the capsule in response to electric fields to produce an image that is displayed.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, and luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to herein describe electrophoretic displays (EPIDs) in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles moves through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al, "Electrical toner movement for electronic paper-like display", IDW Japan, 2001, Paper HCS1-1, and Yamaguchi, Y., et al., "Toner display using insulative particles charged triboelectically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,982,178; and 7,839,564;
(d) Backplanes, adhesive layers and other auxiliary layers and methods used in displays; see for example U.S. Pat. Nos. 7,116,318; and 7,535,624;
(e) Color formation and color adjustment; see for example U.S. Pat. No. 7,075,502; and U.S. Patent Application Publication No. 2007/0109219;
(f) Applications of displays; see for example U.S. Pat. No. 7,312,784; and U.S. Patent Application Publication No. 2006/0279527; and
(g) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display (PDEPID), in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention. The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being affected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

An adhesive layer may be used to join together layers of the display. For example, in some embodiments, the front plane electrode and/or the backplane electrode are adhered to the electro-optic material layer using an adhesive layer. As used herein, the electro-optic material layer also may be referred to as electro-optic medium, ink or ink layer. The adhesive may comprise a polymer (e.g., polyurethane) which may be thermally, chemically, and/or optically cured. As described further below, in some embodiments, the adhesive comprises a polyurethane comprising select end-capping reagents which results in certain performance enhancements. In some embodiments, the end-capping reagent comprises a cyclic carbonate. In some embodiments, the end-capping reagents comprise a first type of end-capping reagent and a second type of end-capping reagent.

The use of adhesives comprises two or more cured moieties (formed by two or more curing steps) may offer several advantages over traditional adhesives. In some embodiments, improved rheology of the adhesive system enables adhesive coatings on a layer (e.g., electro-optic layer such as an air-dried side that has a relatively rougher surface as compared to the smooth, release side ("SSL")) resulting in a decreased coat weight, decreased ink-adhesive coating thickness, improved display resolution, improved low temperature dynamic range, thinner coatings for flexible applications, and reduced formation of voids and/or defects as compared to the use of adhesives with only one cured moiety. In certain embodiments, improved performance of an electro-optic assembly is observed for embodiments where adhesive is dual-cured to form an electro-optic assembly using as compared to being applied by hot melting, including, but not limited to, reduced white state L* loss over time, increased dynamic range, improved low temperature operation (e.g., improved dynamic range), and increased volume resistivity. By contrast, traditional adhesives may suffer from poor low temperature performance, poor rheology, and may have electrical properties (e.g., resistivity) which reduces the functionality of the electro-optic material layer (e.g., reduced switching efficiency).

The term "cured moiety" as used herein generally refers to a physical connection (e.g., a covalent bond, a non-covalent bond, etc.) between two or more polymer backbones. The term backbone is given its typical meaning in the art and generally refers to a series of covalently bound atoms that together create a continuous chain forming the polymer, and generally does not refer to any side chains (e.g., branches) or cross-linked groups. The cured moiety may comprise, in some cases, a crosslink (e.g., the reaction of two or more reactive functional groups with a crosslinking reagent). In an exemplary embodiment, the cured moiety is formed by the reaction of a reactive functional group, a curing species such as a crosslinking reagent, and a second reactive functional group, such that the first reactive functional group and the second reactive functional group are connected by the curing species. In certain embodiments, the first reactive functional group and the second reactive functional group are the same type of reactive functional group. In some cases, the first reactive functional group and the second reactive functional group may be different types of reactive functional groups. In some embodiments, the curing species is connected to the first reactive functional group and/or the second reactive functional group via formation of a bond, such as an ionic bond, a covalent bond, a hydrogen bond, Van der Waals interactions, and the like. The covalent bond may be, for example, carbon-carbon, carbon-oxygen, oxygen-silicon, sulfur-sulfur, phosphorus-nitrogen, carbon-nitrogen, metal-oxygen, or other covalent bonds. The hydrogen bond may be, for example, between hydroxyl, amine, carboxyl, thiol, and/or similar functional groups.

In another exemplary embodiment, the cured moiety is formed by the thermoplastic drying of an adhesive material such that two or more polymer backbones interact to form a bond (e.g., through intermolecular forces such as hydrogen bonding, dipole-dipole, etc.). For example, in some cases, an acrylic (e.g., polyacrylic) polymer may be dried (e.g., via the application of heat to the adhesive material(s)) such that two or more reactive functional groups on the polymer backbone undergo thermoplastic reaction (e.g., by the removal of water and the increase in the glass transition temperature (Tg) of the adhesive material (e.g., for an amorphous adhesive material) and the formation of a bond between the two reactive functional groups) thereby forming a cured moiety connecting the original polymer backbones.

In yet another embodiment, a polyurethane-acrylic hybrid adhesive is cured in a first step by thermoplastic drying, followed by curing in which crosslinking occurs between a reactive species on the polymer backbone of the polyurethane with a reactive species on the acrylic backbone.

In some embodiments, in which the adhesive is formed by two or more curing steps, the adhesive comprises two or more types of cured moieties. For example, in some embodiments, the adhesive comprises a first type of cured moiety comprising a first crosslink (formed by the reaction of a first crosslinking reagent with two or more reactive species) and a second type of cured moiety comprising a second crosslink (formed by the reaction of a second crosslinking reagent with two or more reactive species). The first and second crosslinking reagents may be, in some cases, the same or different. In another embodiment, the adhesive may comprise a first type of cured moiety comprises a first crosslink and a second type of cured moiety comprising a thermoplastic linkage.

The term "curing species" as used herein generally refers to a compound that facilitates the reaction between two or more reactive functional groups such that the reactive functional groups are connected. The curing species may be, in some cases, a crosslinking reagent. The reaction of a curing species with two or more reactive functional groups may form a cured moiety, as described above.

Figure 1B:
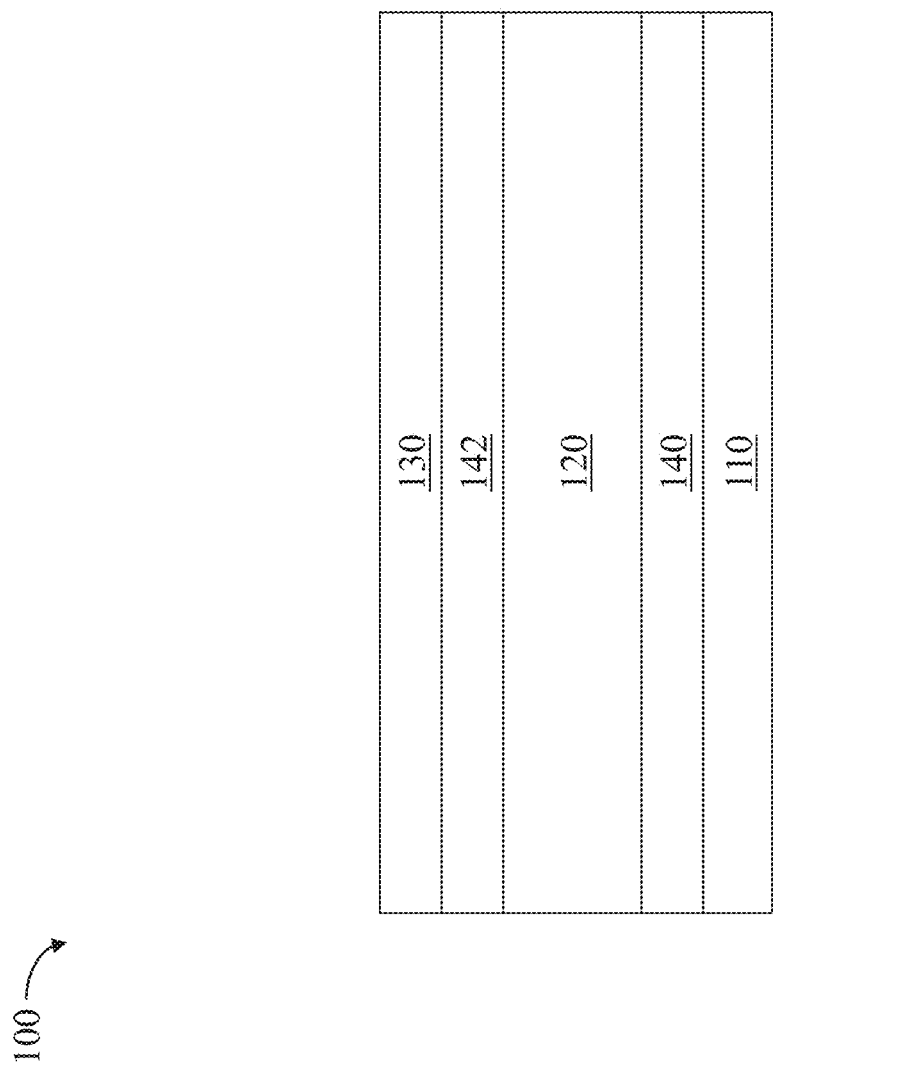
Figure 1C:
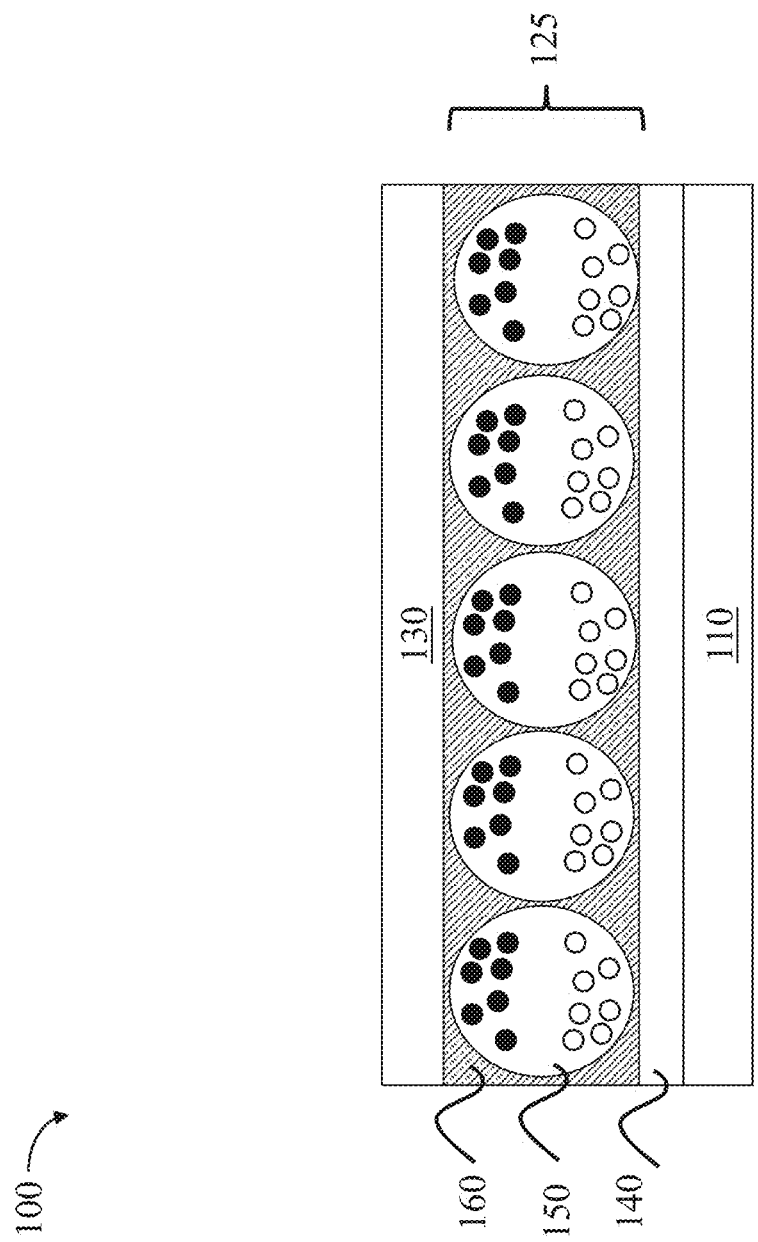
Figure 1D:
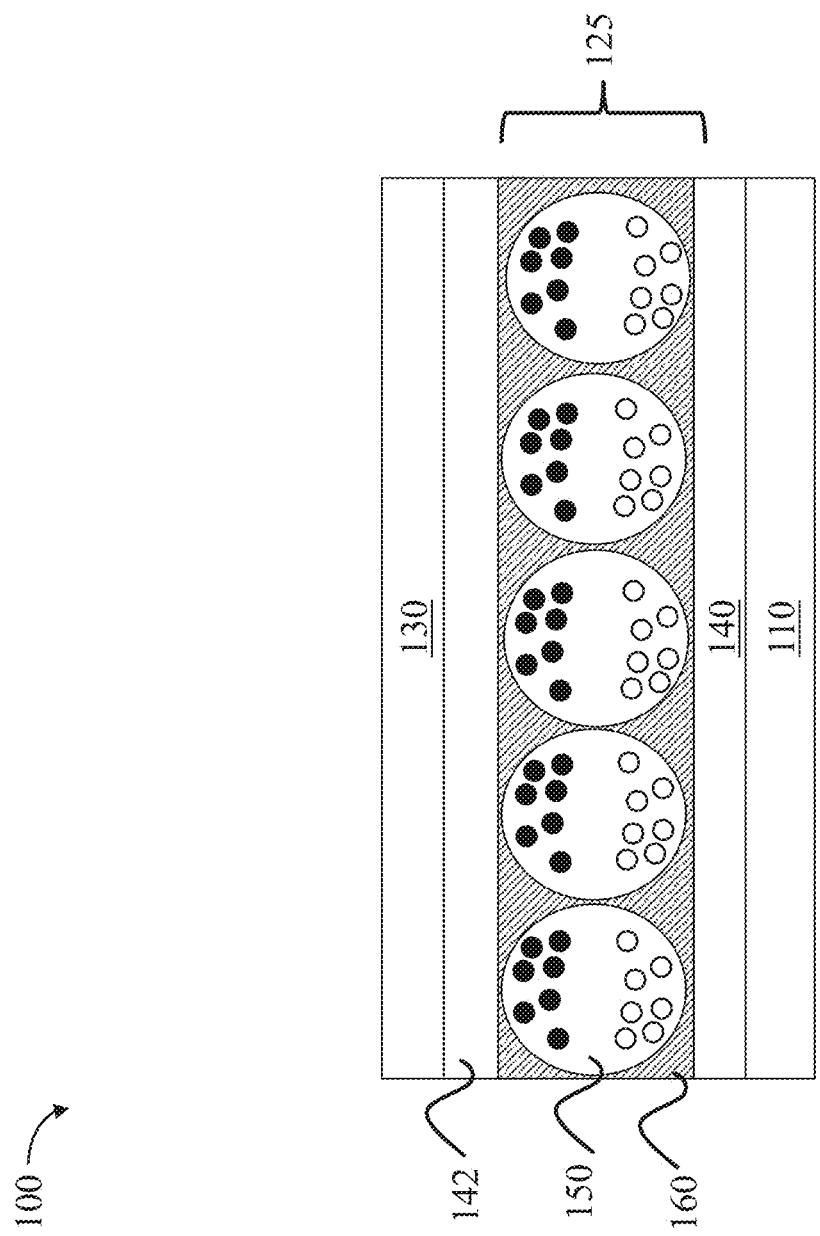

As illustrated in FIG. 1A, in some embodiments, an electro-optic assembly 100 comprises a backplane electrode 110, a front plane electrode 130, and an electro-optic material layer 120. As noted above, different layers of the assembly can be joined together with an adhesive layer 140. In some embodiments, as shown in FIGS. 1A and 1B, backplane electrode 110 is adhered to the electro-optic material layer by adhesive layer 140. In some embodiments, as illustrated in FIG. 1B, front plane electrode 130 is adhered to electro-optic material layer 120 by adhesive layer 142, which may comprise the same or different adhesive as adhesive layer 140. As illustrated in FIG. 1C, an electro-optic material layer 125 may comprise capsules 150 and a binder 160, described in more detail below. The capsules 150 may encapsulate one or more particles that can be caused to move with the application of an electric field across the electro-optic material layer 125. In some such embodiments, front plane electrode 130 may be directly adjacent electro-optic material layer 125 and backplane electrode 110 is adhered to the electro-optic material layer by adhesive layer 140. In an exemplary embodiment, as illustrated in FIG. 1D, backplane electrode 110 may be adhered to electro-optic material layer 125 by adhesive layer 140 and front plane electrode 130 may be adhered to electro-optic material layer 125 by adhesive layer 142. In another exemplary embodiment, as illustrated in FIG. 1E, front plane electrode 130 may be adhered to electro-optic material layer 125 by adhesive layer 140 and backplane electrode 110 may be adhered to electro-optic material layer 125 by adhesive layer 142.

It should be understood that the adhesive layer may be used to adhere any type and number of layers to one or more other layers in the assembly, and the assembly may include one or more additional layers that are not shown in the figures. Additionally, while FIGS. 1C-1E illustrate an encapsulated electro-optic medium, the adhesive layers are useful in a variety of electro-optic assemblies, such as liquid crystal, frustrated internal reflection, and light-emitting diode assemblies.

In addition to the polyurethanes of the invention, the adhesive layers may include additional components. Non-limiting examples of suitable components include other polyurethanes, acrylics, alkyds, epoxies, aminos, and siloxanes. In some cases, the adhesive layer may comprise two or more types of similar adhesive materials (e.g., two types of acrylics, an acrylic and an alkyd, a polyurethane and a siloxane, two types of polyurethanes, a polyurethane and an acrylic).

In some embodiments, the adhesive is provided in the form of a dispersion (e.g., an aqueous dispersion). For example, in some cases, an adhesive dispersion may be used directly in a coating process and/or by solutions of reactive monomers in dispersions or solutions of adhesives to form an adhesive layer as described herein. In some cases, the aqueous dispersion comprises water which may be removed (e.g., via the application of heat) after deposition of the adhesive to one or more surfaces.

Generally, polyurethanes are prepared via a polyadditional process involving a diisocyante. Non-limiting examples of polyurethanes include polyether polyurethanes, polyester polyurethanes, polyether polyureas, polyureas, polyester polyureas, polyester polyureas, polyisocyanates (e.g., polyurethanes comprising isocyanate bonds), and polycarbodiimides (e.g., polyurethanes comprising carbodiimide bonds). Generally, however, the polyurethane contains urethane groups. The polyurethanes utilized in the assemblies and methods described herein may be prepared using methods known in the art. Generally, an isocyanate-terminated polyurethane is formed by reaction of at least one diisocyanate compound with a secondary reagent comprising at least two groups which are capable of reacting with an isocyanate group (e.g., a polyol). In some embodiments, the polyurethane is a linear polymer formed via reaction of a diisocyanate compound and a secondary reagent comprising two groups which are capable of reacting with an isocyanate group (e.g., a diol). Following preparation of the isocyanate-terminated polyurethane, the terminal isocyanate groups may be deactivated via reaction with a terminating reagent, respectively, thereby forming a terminated polyurethane (e.g., such that the polyurethane and/or terminal isocyanate groups do not undergo further reaction). For example, following preparation of the isocyanate-terminated polyurethane, the terminal isocyanate groups may be end-capped via reaction with one or more end-capping reagents, thereby forming an end-capped polyurethane. In some cases, the isocyanate-terminated polyurethane may be neutralized via reaction with a neutralizing reagent, such that the polyurethane may be dispersed into water such as when stabilized by ionic groups. In some embodiments, the molecular weight of polyurethane may be controlled by the addition of at least one type of end-capping reagent. End-capping reagents are described in more detail below and may also be used in the preparation of other adhesives. The polyurethane (e.g., isocyanate-terminated polyurethane, end-capped polyurethane, and/or neutralized polyurethane) may also be optionally chain-extended via reaction with a chain-extending reagent. While the aforementioned steps may be conducted sequentially as described above, in alternative embodiments, the order of the steps may be varied and/or one more steps may be carried out simultaneously. For example, in some embodiments, the polyurethane may be formed by a providing a mixture of at least one diisocyanate, a secondary reagent comprising at least two groups which are capable of reacting with an isocyanate group, and one or more end-capping reagents, and substantially simultaneously reacting the mixture. In some cases, the one or more end-capping reagents are added after reacting a mixture comprising at least one diisocyanate and a second reagent comprising at least two groups which are capable of reacting with an isocyanate group. The end-capping reagents may be added during the reaction of the mixture and/or after the reaction of the mixture (e.g., after neutralization of the reaction, as described herein).

In some embodiments, the isocyanate-terminated polyurethane is formed via reaction of at least one diisocyanate compound with at least one difunctional polyol or at least one multifunctional polyol. In some embodiments, the polyol is a diol (e.g., an oligomer with two alcohol terminal groups, a polymer with two alcohol terminal groups). Generally, the reaction is carried out using a stoichiometric excess of the at least diisocyanate compound, thereby aiding in the formation of an isocyanate-terminated polyurethane. In some embodiments, the ratio of the at least one diisocyanate compound to the diol is between about 2:1 and about 1:2, or between about 1.5:1 and about 1:1.5, or about 1:1. Those of ordinary skill in the art will be able to adjust this ratio when using polyols which include more than two reactive —OH groups. More than one type of diisocyanate compound may be utilized, for example, two types, three types, or four types of diisocyanate compounds. Further, more than one type of diol (or polyol) may be utilized, for example, two types, three types, or four types of diols. In some embodiments, three types of diols are utilized.

The term diisocyanate is given its ordinary meaning in the art and is used to describe a linear, cyclic, or branch-chained hydrocarbons, including aromatic, cycloaliphatic, and aliphatic hydrocarbons having two free isocyanate groups. Non-limiting examples of diisocyanate compounds include 4,4-methylenebis(cyclohexylisocyanate) (H12 MDI), α,α,α,α-tetramethylxylene diisocyanate, 3,5,5-trimethyl-1-isocyanato-3-isocyanatomethylcyclohexane isophorone diisocyanate and derivatives thereof, tetramethylene diisocyanate, hexamethylene diisocyanate (HIM) and derivatives thereof, 2,4-toluene diisocyanate, 2,6-toluene diisocyanate, isophorone diisocyanate, m-isopropenyl-α,α-dimethylbenzyl isocyanate, benzene 1,3-bis(1-iscyanato-1-methylethyl, 1-5 naphthalene diisocyanate, phenylene diisocyanate, trans-cyclohexane-1,4-diisocyanate, bitolylene diisocyanate, 4,4'-diphenylmethane diisocyanate, 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxy butane-1,4-diisocyanate, butane-1,4-diisocyanate, hexane-1,6-diisocyanate, dicyclohexyl methane diisocyanate, cyclohexane-1,4-diisocyanate, ethylene diisocyanate, phthalic acid-bis-isocyanatoethyl ester, also polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. In some embodiments, the diisocyanate compound is 4,4-methylenebis(cyclohexylisocyanate).

While most of the embodiments described herein utilize a secondary reagent comprising a polyol or a diol, this is by no means limiting, and other types of secondary reagents may be utilized to form the adhesive (e.g., an adhesive comprising polyurethane). In some embodiments, the secondary reagent comprises a polyamine or a diamine. In certain embodiments, the secondary reagent comprises a thiol group. Those skilled in the art would be capable of selecting suitable secondary reagents based upon the teachings of the specification. The term polyol is given its ordinary meaning in the art and refers to any organic compound having two or more hydroxyl groups, wherein the hydroxyl groups are capable of reacting with an isocyanate group. Generally, to form linear polyurethanes, the polyol utilized is a diol. In some embodiments, the diol is a difunctional polyol. In certain embodiments, the diol is a difunctional oligomer with two reactive alcohol groups. Non-limiting examples of difunctional polyols include polyethylene glycol, polypropylene glycol (PPO), polytetramethylene glycol. The molecular weight of polyol may vary. In some embodiments, the molecular weight (Mn) is less than about 5000, or less than about 3000, or between about 500 and about 5000, or between about 500 and about 4000, or between about 500 and about 3000.

In some embodiments, at least one diol comprises an ionic group (e.g., a carboxylic acid group). The ionic group may be used to stabilize the polyurethane (e.g., when dispersed in water) and/or may be utilized for crosslinking. Non-limiting examples of diols comprising an ionic group include dimethylolpropionic acid (DMPA), dimethylolbutanoic acid, dimethylolpentanoic acid, diethylolpropionic acid, diethylolbutanoic acid, 1,4-dihydroxy-2-butane sulfonic acid, 1,5-dihydroxy-2-pentane sulfonic acid, 1,5-dihydroxy-3-pentane sulfonic acid, 1,3-dihydroxy-2-propane sulfonic acid, dimethylolethane sulfonic acid, N-methyldiethanolamine, N-ethyldiethanolamine, N-propyidiethanolamine, N,N-dimethyl-2-dimethylolbutylamine, N,N-diethyl-2-dimethylolbutylamine, N,N-dimethyl-2-dimethylolpropylamine. In some embodiments, the ionic group is a carboxylic acid group. Non-limiting examples of diols comprises a carboxylic acid group include dimethylolpropionic acid, dimethylolbutanoic acid, dimethylolpentanoic acid, diethylolpropionic acid, and diethylolbutanoic acid, polyester diol, and other polymeric carboxylic acid groups. In some embodiments, the diol comprising an ionic group is dimethylolpropionic acid.

As noted above, in some embodiments, the secondary reagent may comprise a first type of secondary reagent (e.g., a first type of diol) and a second type of secondary reagent (e.g., a second type of diol). In some embodiments, the secondary reagent may comprise a first type of secondary reagent (e.g., a first type of diol), a second type of secondary reagent (e.g., a second type of diol), and a third type of secondary reagent (e.g., a third type of diol). In some embodiments, the first type of diol is a difunctional polyol (e.g., polypropylene glycol), the second type of diol comprises an ionic group (e.g., a carboxylic acid group, such as DMPA), and the third type of diol may function as a non-ionic stabilizer.

As noted above, while polyurethane is provided as an exemplary adhesive material, those skilled in the art would be capable of utilizing the compositions and methods described herein in adhesives comprising other types of adhesives. In some embodiments, the adhesive comprises an acrylic. In certain embodiments, the adhesive comprises two or more types of adhesives (e.g., a polyurethane and an acrylic).

Such adhesive mixtures (i.e. hybrid adhesives) may be formed by physically blending at least two components which may be any combination of solution or dispersed materials in aqueous or solvent based media. In some embodiments, the hybrid adhesives may also be formed by synthetic polymerization processes where one component is polymerized in the presence of a second polymeric component, or both polymers may be formed simultaneously. In some cases, the hybrid adhesives may be formed by emulsifying polymerizable monomers in an adhesive dispersion that is used directly in the coating process, and/or by solutions of reactive monomers in dispersions or solutions of adhesives. In some cases, polymerization of the monomers may occur at the primary or secondary stages (i.e. cures) and may also help in ink surface void filling and particle coalescence (e.g., if using dispersions).

As described above, in some embodiments, the adhesive material comprises two or more reactive functional groups. The reactive functional groups may be positioned as end groups, along the backbone or along chains extended from the backbone.

Reactive functional groups generally refer to a chemical group (present on the adhesive) configured to react with one or more curing species (e.g., a crosslinking reagent, a chain-extending reagent). In some embodiments, the reactive functional group reacts with a curing species to form a cured moiety such as a crosslink, a thermoplastic linkage, a bond between two types of adhesive materials, or the like. In certain embodiments, a reactive functional group may react with a curing species such as a crosslinking reagent to form a crosslink. In some cases, a reactive functional group may be configured to react with another reactive functional group under a particular set of conditions (e.g., at a particular range of temperatures). In some embodiments, a reactive functional group my react under certain conditions such that the adhesive material undergoes thermoplastic drying. Non-limiting examples of reactive functional groups include hydroxyls, carbonyls, aldehydes, carboxylases, amines, imines, imides, azides, ethers, esters, sulfhydryls (thiols), silanes, nitrites, carbamates, imidazoles, pyrrolidones, carbonates, acrylates, alkenyls, and alkynyls. Other reactive functional groups are also possible and those skilled in the art would be capable of selecting suitable reactive functional groups for use with dual cure adhesives, based upon the teachings of this specification. Those skilled in the art would also understand that the curing steps described herein do not generally refer to the formation of an adhesive material (e.g., polymerization of an adhesive backbone such as a polyurethane backbone) but the further reaction of an adhesive material such that the adhesive material forms crosslinks, undergoes thermoplastic drying, or the like such that the adhesive undergoes a substantial change in mechanical properties, viscosity, and/or adhesiveness. For example, in certain embodiments, one or more of the elastic modulus, the viscosity, and the adhesiveness of the adhesive material after curing may increase by between about 5% and about 1000% as compared to the elastic modulus, the viscosity, and/or the adhesiveness of the adhesive material prior to curing. In some embodiments, one or more of the elastic modulus, the viscosity, and the adhesiveness of the adhesive material after curing may increase by at least about 10%, at least about 20%, at least about 50%, at least about 100%, at least about 200%, or at least about 500% as compared to the elastic modulus, the viscosity, and/or the adhesiveness of the adhesive material prior to curing.

In some embodiments, the reactive functional group is present on the backbone of the adhesive. For example, in embodiments where the adhesive comprises a polyurethane, the reactive functional group may be present on the diisocyante group and/or on the polyol group reacted to form the polyurethane.

In certain embodiments, the reactive functional group is present on an end-capping reagent. As described above for the exemplary isocyanate-terminated polyurethane adhesive, the isocyanate-terminated polyurethane may be end-capped by reaction with at least one type of end-capping reagent, thereby forming an end-capped adhesive (e.g., end-capped polyurethane). As noted above, use of an end-capping reagent may aid in controlling the molecular weight of the adhesive. In some embodiments, more than one type of end-capping reagent may utilized, for example, two types, three types, or four types of end-capping reagent. The total amount of end-capping agents may be adjusted to produce an adhesive which is either partially or completely end-capped.

For example, partial end-capping may be achieved by reaction of the adhesive (e.g., the isocyanate-terminated polyurethane) with less than a 100% stoichiometric amount of the end-capping reagent(s). In some embodiments, following reaction of the isocyanate-terminated polyurethane with the end-capping reagent, 50 to 100% of the polyurethane is end-capped. In certain embodiments, following reaction of the isocyanate-terminated polyurethane with the end-capping reagent, at least about 50%, at least about 60%, at least about 75%, at least about 80%, or at least about 90% of the polyurethane is terminated with an end-cap group. In some cases, less than or equal to 100%, less than or equal to about 90%, less than or equal to about 80%, less than or equal to about 75%, or less than or equal to about 60% of the polyurethane is terminated with an end-cap group. Combinations of the above-referenced ranges are also possible (e.g., between about 50% and 100%, between 50% and 75%, between 60% and 90%, between 75% and 100%). Those of ordinary skill in the art will be aware of methods to determine the amount of isocyanate group remaining, for example, by determining the loss of isocyanates by IR and isocyanate titration and/or via gas chromatography-mass spectroscopy of residual end group monomers. End-capped adhesives such as polyurethanes may be neutralized and/or chain-extended, as described in more detail herein.

Figure 2:
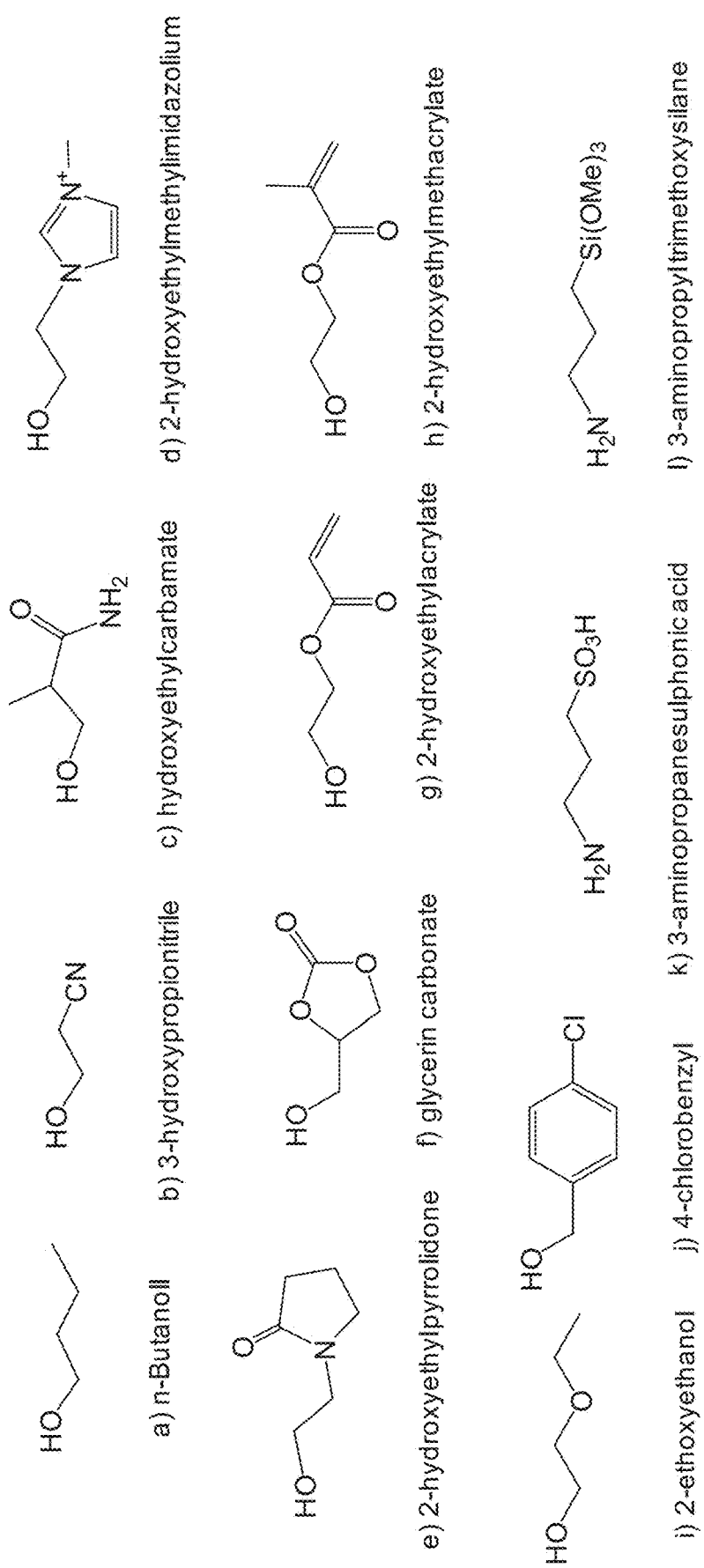
FIG. 2 exemplifies end-capping reagents that may be used in the creation of adhesive layers for electro-optic assemblies.

In certain embodiments, the end-capping reagent comprising the reactive functional group. Non-limiting examples of suitable end-capping reagents (e.g., comprising reactive functional groups) are shown in FIG. 2 and are described in more detail, below.

In some embodiments, at least one of the types of end-capping reagent includes a compound having the structure as in Formula (I):

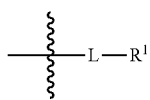
(I)

wherein $R^1$ is selected from the group consisting of hydrogen, optionally substituted alkyl, optionally substituted heteroalkyl, optionally substituted aryl, optionally substituted heteroaryl, optionally substituted nitrile, optionally substituted carbamate, optionally substituted imidazolium, optionally substituted pyrrolidone, optionally substituted carbonate, optionally substituted acrylate, optionally substituted ether, optionally substituted ester, optionally substituted halide, optionally substituted acid, optionally substituted silane, optionally substituted thiol, L is a linking group, optionally absent, and ∼∼∼ represents the location of a bond to the polyurethane. Non-limiting examples of linking groups include optionally substituted alkylenes, optionally substituted heteroalkylenes, optionally substituted arylenes, and optionally substituted heteroarylenes. In some embodiments, $R^1$ is hydrogen. In certain embodiments, $R^1$ comprises the reactive functional group. In some embodiments, L comprises the reactive functional group.

In some embodiments, an end-capping reagent comprising Formula (I) is associated with a polyurethane via reaction of a isocyanate-terminated polyurethane and an end-capping reagent comprising Formula (II):

Q-L-$R^1$ (II), wherein L and $R^1$ are as described above in connection with Formula (I). In some embodiments, Q is hydroxyl (HO—) or amino (H$_2$N—) For example, in some such embodiments, the end-capping reagent is n-butanol.

Again, while polyurethane is used as an exemplary adhesive herein, those skilled in the art would be capable of utilizing any suitable adhesive with one or more suitable end-capping reagents, as described herein.

In some embodiments, at least one of the types of end-capping reagent includes a nitrile resulting in an end-capped polyurethane comprising a nitrite. The term "nitrile" is given its ordinary meaning in the art and generally refers to a molecular group containing at least one type of cyanide group. In some embodiments, the end-capping reagent comprising a nitrile comprises Formula (III):

(III)

wherein L is described above as in Formula (I).

In some embodiments, Formula (III) comprises Formula (IV):

(IV)

wherein m is 1-10. In some embodiments, m is 1-5, or 1-3, or 1, or 2, or 3, or 4, or 5. In some embodiments, m is 1. In some embodiments, an end-capping reagent comprising Formula (III) or (IV) is associated with a polyurethane via reaction of a isocyanate-terminated polyurethane and an end-capping reagent comprising Formula (V):

Q-L-C≡N (V)

wherein Q is hydroxyl or amino. For example, in some such embodiments, the end-capping reagent is 3-hydroxypropionitrile.

In some embodiments, at least one of the types of end-capping reagent includes a carbamate resulting in an end-capped polyurethane comprising a carbamate. The term "carbamate" is given its ordinary meaning in the art and generally refers to a molecular group containing at least one type of —OOCNH$_2$ group. In some embodiments, the end-capping reagent comprising a carbamate comprises Formula (VI):

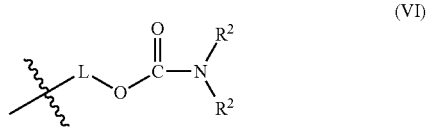
(VI)

wherein L is described above as in Formula (I) and wherein each $R^2$ is the same or different and is selected from the group consisting of hydrogen, optionally substituted alkyl, optionally substituted heteroalkyl, optionally substituted aryl, optionally substituted heteroaryl, optionally substituted halide, and optionally substituted hydroxyl. In certain embodiments, $R^2$ comprises the reactive functional group. In some embodiments, L comprises the reactive functional group.

In some embodiments, Formula (VI) comprises Formula (VII):

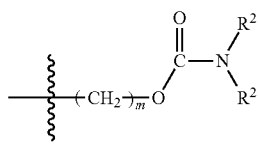
(VII)

wherein m is 1-10. In some embodiments, m is 1-5, or 1-3, or 1, or 2, or 3, or 4, or 5. In some embodiments, m is 1. In some embodiments, an end-capping reagent comprising Formula (VI) or (VII) is associated with a polyurethane via reaction of a isocyanate-terminated polyurethane and an end-capping reagent comprising Formula (VIII):

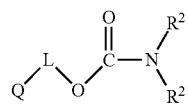
(VIII)

wherein Q is hydroxyl or amino, L is described above as in Formula (I), and $R^2$ is described above as in Formula (VI). For example, in some such embodiments, the end-capping reagent is hydroxyethyl carbamate.

In some embodiments, at least one of the types of end-capping reagent includes an imidazole resulting in an end-capped polyurethane comprising a imidazole. In some embodiments, the end-capping reagent comprising a imidazole comprises Formula (IX):

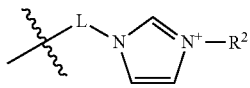
(IX)

wherein L is described above as in Formula (I) and $R^2$ is described above as in Formula (VI).

In some embodiments, Formula (IX) comprises Formula (X):

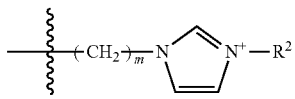
(X)

wherein m is 1-10. In some embodiments, m is 1-5, or 1-3, or 1, or 2, or 3, or 4, or 5. In some embodiments, in is 1. In some embodiments, an end-capping reagent comprising Formula (IX) or (X) is associated with a polyurethane via reaction of a isocyanate-terminated polyurethane and an end-capping reagent comprising Formula (XI):

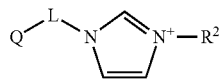
(XI)

wherein Q is hydroxyl or amino and $R^2$ is described above as in Formula (VI). For example, in some such embodiments, the end-capping reagent is 2-hydroxyethylmethyl imidazolium.

In some embodiments, at least one of the types of end-capping reagent includes a cyclic carbonate resulting in an end-capped polyurethane comprising an end-capping reagent comprising a cyclic carbonate. The term "cyclic carbonate" is given its ordinary meaning in the art and refers to a molecular group containing at least one type of cyclic carbonate oligomer, e.g., dimer, trimer, tetramer, etc. In some embodiments, the end-capping reagent comprising a cyclic carbonate comprises Formula (XII):

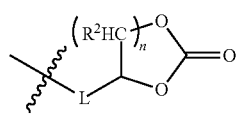
(XII)

wherein $R^2$ is described above as in Formula (VI), L is described above as in Formula (I), n is 1-4, and ⌇⌇⌇ represents the location of a bond to the polyurethane. In some embodiments, $R^2$ is hydrogen. In some embodiments, n is 1. In certain embodiments, n is 2. In some embodiments, L is optionally substituted alkylene. In some embodiments, Formula (XII) comprises Formula (XIII):

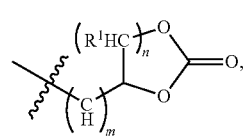
(XIII)

wherein m is 1-10. In some embodiments, m is 1-5, or 1-3, or 1, or 2, or 3, or 4, or 5. In some embodiments, m is 1. In some embodiments, $R^1$ is hydrogen. In some embodiments, an end-capping reagent comprising Formula (II) or (III) is associated with a polyurethane via reaction of a isocyanate-terminated polyurethane and an end-capping reagent comprising Formula (XIV):

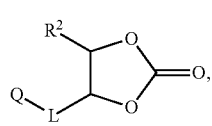
(XIV)

wherein L and $R^2$ are as described above in connection with Formula (XII) and Q is hydroxyl or amino. In some embodiments, the compound of Formula (XIV) comprises Formula (XV):

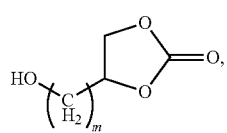
(XV)

wherein m is as described above in connection with Formula (XIII). In some embodiments, m is 1. For example, in some such embodiments, the end-capping reagent is glycerin carbonate.

In some embodiments, an end-capping reagent comprises a pyrrolidone. In some embodiments, the end-capping reagent comprising a pyrrolidone comprises Formula (XVI):

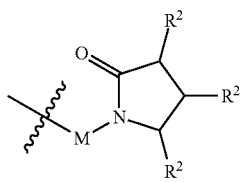

(XVI)

wherein each $R^2$ is the same or different and is selected from the group consisting of hydrogen, optionally substituted alkyl, optionally substituted heteroalkyl, optionally substituted aryl, optionally substituted heteroaryl, optionally substituted halide, and optionally substituted hydroxyl, M is a linking group, optionally absent, and — represents the location of a bond to the polyurethane. Non-limited examples of linking groups include optionally substituted alkylene and optionally substituted heteroalkylene. In some embodiments, each $R^2$ is hydrogen. In some embodiments, M is optionally substituted alkylene. In some embodiments, Formula (XVI) comprises Formula (XVII): In certain embodiments, M comprises the reactive functional group.

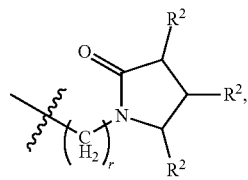

(XVII)

wherein r is 1-10. In some embodiments, r is 1-5, or 1-3, or 1, or 2, or 3, or 4, or 5. In some embodiments, r is 2. In some embodiments, an end-capping reagent comprising Formula (XVI) or (XVII) is associated with a polyurethane via reaction of a isocyanate-terminated polyurethane and an end-capping reagent comprising Formula (XVIII):

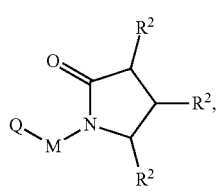

(XVIII)

wherein M and $R^2$ are as described above in connection with Formula (XVI) and Q is hydroxyl or amino. In some embodiments, the compound of Formula (XVIII) comprises Formula (XIX):

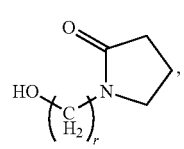

(XIX)

wherein r is as described above in connection with Formula (XVII). In some embodiments, r is 2. For example, in some such embodiments, the end-capping reagent is 2-hydroxyethyl pyrrolidone.

In some embodiments, at least one of the types of end-capping reagent includes an acrylate resulting in an end-capped polyurethane comprising an acrylate. In some embodiments, the end-capping reagent comprising an acrylate comprises Formula (XX):

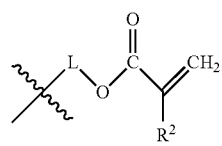

(XX)

wherein L is described above as in Formula (I) and $R^2$ is described above as in Formula (VI).

In some embodiments, Formula (XX) comprises Formula (XXI):

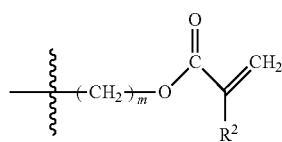

(XXI)

wherein m is 1-10. In some embodiments, m is 1-5, or 1-3, or 1, or 2, or 3, or 4, or 5. In some embodiments, m is 1. In some embodiments, an end-capping reagent comprising Formula (XX) or (XXI) is associated with a polyurethane via reaction of a isocyanate-terminated polyurethane and an end-capping reagent comprising Formula (XXII):

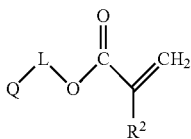

(XXII)

wherein Q is hydroxyl or amino and $R^2$ is described above as in Formula (VI). For example, in some such embodiments, the end-capping reagent is 2-hydroxyethyl acrylate or 2-hydroxyethyl methacrylate.

In some embodiments, at least one of the types of end-capping reagent includes an ether resulting in an end-capped polyurethane comprising an ether. In some embodiments, the end-capping reagent comprising an ether comprises Formula (XXIII):

(XXIII)

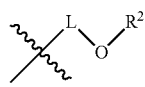

wherein L is described above as in Formula (I) and $R^2$ is described above as in Formula (VI).

In some embodiments, Formula (XXIII) comprises Formula (XXIV):

(XXIV)

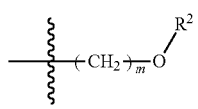

wherein m is 1-10. In some embodiments, m is 1-5, or 1-3, or 1, or 2, or 3, or 4, or 5. In some embodiments, m is 1. In some embodiments, an end-capping reagent comprising Formula (XXIII) or (XXIV) is associated with a polyurethane via reaction of a isocyanate-terminated polyurethane and an end-capping reagent comprising Formula (XXV):

(XXV)

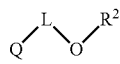

wherein Q is hydroxyl or amino and $R^2$ is described above as in Formula (VI). For example, in some such embodiments, the end-capping reagent is 2-ethoxyethanol.

In some embodiments, at least one of the types of end-capping reagent includes a halide resulting in an end-capped polyurethane comprising an halide. In some embodiments, the end-capping reagent comprising an halide comprises Formula (XXVI):

(XXVI)

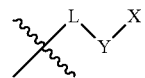

wherein L is described above as in Formula (I), X is a halogen (e.g., Cl, Br, I), and Y is optionally substituted arylene, optionally substituted $C_{1-10}$ alkylene, or optionally substituted alkylene oxide. In some embodiments, Y comprises the reactive functional group. In certain embodiments, X comprises the reactive functional group.

In some embodiments, Formula (XXVI) comprises Formula (XXVII):

(XXVII)

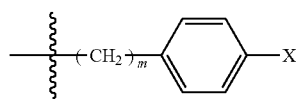

wherein m is 1-10. In some embodiments, m is 1-5, or 1-3, or 1, or 2, or 3, or 4, or 5. In some embodiments, m is 1. In some embodiments, an end-capping reagent comprising Formula (XXVI) or (XXVII) is associated with a polyurethane via reaction of a isocyanate-terminated polyurethane and an end-capping reagent comprising Formula (XXVIII):

(XXVIII)

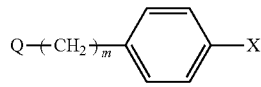

wherein Q is hydroxyl or amino. For example, in some such embodiments, the end-capping reagent is 4-chlorobenzyl alcohol.

In some embodiments, Formula (XXVI) comprises Formula (XXVII):

(XXVII)

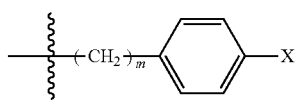

wherein m is 1-10. In some embodiments, m, is 1-5, or 1-3, or 1, or 2, or 3, or 4, or 5. In some embodiments, m is 1. In some embodiments, an end-capping reagent comprising Formula (XXVI) or (XXVII) is associated with a polyurethane via reaction of a isocyanate-terminated polyurethane and an end-capping reagent comprising Formula (XXVIII):

(XXVIII)

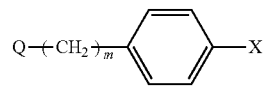

wherein Q is hydroxyl or amino. For example, in some such embodiments, the end-capping reagent is 4-chlorobenzyl alcohol.

In some embodiments, at least one of the types of end-capping reagent includes an acid resulting in an end-capped polyurethane comprising an acid. In some embodiments, the end-capping reagent comprising an acid comprises Formula (XXIX) or Formula (XXX):

(XXIX)

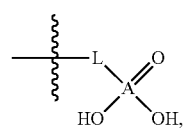

(XXX)

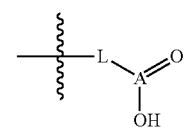

wherein L is described above as in Formula (I), A is sulfur phosphorous, or boron. In some such embodiments, L is —$(CH_2)_m$— and m is 1-10. In some embodiments, m is 1-5, or 1-3, or 1, or 2, or 3, or 4, or 5. In some embodiments, an end-capping reagent comprising Formula (XXIX) or (XXX) is associated with a polyurethane via reaction of a isocyanate-terminated polyurethane and an end-capping reagent comprising Formula (XXXI) or Formula (XXVII):

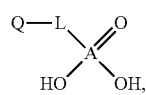

(XXXI)

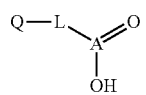

(XXXII)

wherein Q is hydroxyl or amino. For example, in some such embodiments, the end-capping reagent is 3-aminopropane sulphonic acid.

Additional suitable end-capping reagents including an ether and/or an acid are described, for example, in U.S. Patent Application Number US 2011/0306724, which is incorporated herein by reference.

In some embodiments, at least one of the types of end-capping reagent includes a silane resulting in an end-capped polyurethane comprising a silane. In some embodiments, the end-capping reagent comprising a silane comprises Formula (XXXIII):

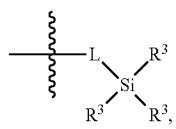

(XXXIII)

wherein L is described above as in Formula (I), and wherein each $R^3$ is the same or different and comprises —$(CH_2)_n$— or —O—$(CH_2)_n$, where each n is the same or different and 1-4. In some embodiments, each n is the same or different and is 1 or 2. In some embodiments, $R^3$ comprises the reactive functional group.

In some embodiments, an end-capping reagent comprising Formula (XXXIII) is associated with a polyurethane via reaction of a isocyanate-terminated polyurethane and an end-capping reagent comprising Formula (XXXIV):

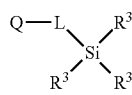

(XXXIV)

wherein Q is hydroxyl or amino. For example, in some such embodiments, the end-capping reagent is 3-aminopropyl trimethoxysilane.

In some embodiments, a first type and a second type of end-capping reagent are used. For example, in some cases, the first type of end-capping reagent comprises a cyclic carbonate and the second type of end-capping reagent comprises a pyrrolidone. Any suitable ratio of the first type of end-capping reagent to the second type of end-capping reagent may be utilized, for example, between about 1:2 and about 2:1, between about 1:1.5 and about 1.5:1, or about 1:1.

Those of ordinary skill in the art will be aware of other suitable types of end-capping reagents and/or reagents in addition to those described herein. For example, in some embodiments, the end-capping group and/or reagent comprises an alkyl, an aryl, a cyano, a carbamate, and/or an acrylate group.

In some embodiments, the adhesive (e.g., end-capped or isocyanate-terminated polyurethane) may be chain extended via reaction of the adhesive with a chain-extending reagent. The chain extension may be carried out under conditions suitable to obtain a targeted Mn of the adhesive and/or to obtain a targeted degree of functionality of the adhesive. In some embodiments, the chain extension may be carried out via reaction of one or more of the side-groups of the adhesive. In some embodiments, the reactive functional group is present on the chain-extending reagent.

Those of ordinary skill in the art will be aware of methods and systems for determining the molecular weight of a polyurethane or other polymer (e.g., a polyol used to prepare the polyurethane). In some embodiments, the molecular weight may be determined using gel permeation chromatography (GPC). In some embodiments, the molecular weight (Mn) is determined using GPC calibrated using polystyrene standards.

Those of ordinary skill in the art will be aware of methods and systems for determining the degree of functionality (i.e. the average number per molecule and/or fraction of reactive functional group present in the adhesive capable of reacting with a curing species such that a cured moiety such as a crosslink is formed).

Again, referring to polyurethane as an exemplary adhesive, in some embodiments, the chain-extending reagent may comprise a diol or a diamine. For example, the chain-extending reagent can comprise a diamino compound. Non-limiting examples of diamino compounds include compounds having the structure $H_2N$—$R^4$—$NH_2$, wherein $R^4$ is optionally substituted arylene or optionally substituted alkylene. In some embodiments, $R^4$ is —$(CH_2)p$- wherein p is 1-10, or 2-8, or 3-7, or 4-6. In some embodiments, the chain-extending reagent is hexamethylene diamine. In certain embodiments, $R^4$ comprises a reactive functional group. In an exemplary embodiment, the chain-extending reagent is 1,3-diamino-2-propanol (e.g., wherein the hydroxyl group is the reactive functional group).

In some embodiments, the chain-extending reagent comprises a diol compound (e.g., as described above). Non-limiting examples of diol compounds include compounds having the structure HO—$R^5$—OH, wherein $R^5$ is optionally substituted arylene or optionally substituted alkylene. In some embodiments, $R^5$ is —$(CH_2)p$- wherein p is 1-10, or 2-8, or 3-7, or 4-6. In certain embodiments, $R^5$ comprises a reactive functional group. In an exemplary embodiment, the chain-extending reagent comprises the structure as in Formula (XXXV):

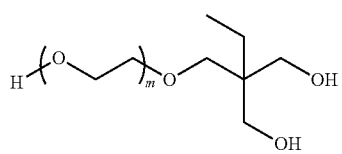

Figure 3:
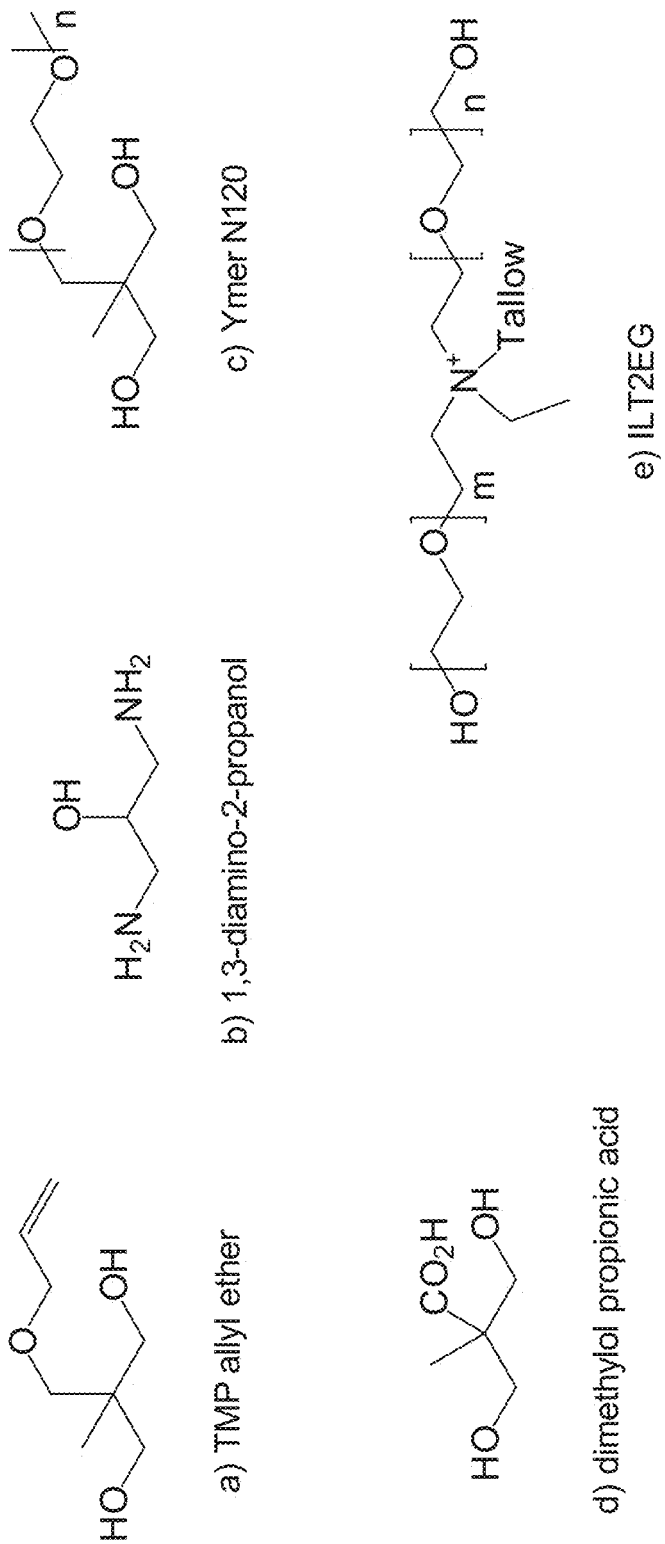
FIG. 3 exemplifies chain-extending reagents that may be used in the creation of adhesive layers for electro-optic assemblies.

(XXXV)

wherein m is 1-100. In some embodiments, m is at least 1, at least 2, at least 5, at least 10, at least 20, at least 50, or at least 75. In certain embodiments, m is less than or equal to 100, less than or equal to 75, less than or equal to 50, less than or equal to 20, less than or equal to 10, less than or equal to 5, or less than or equal to 2. Combinations of the above-referenced ranges are also possible (e.g., m is 1 to 100, m is 1 to 20, m is 10 to 50, m is 20 to 75, m is 50 to 100). Other ranges are also possible. Additional non-limiting examples of chain-extending reagents (e.g., diaminos and diols) comprising one or more functional groups are shown in FIG. 3.

In some embodiments, at least a portion of the remaining reactive isocyanate groups following polymerization may be deactivated via addition of one or more terminating reagents such that the remaining isocyanate groups do not substantially react. For example, in some embodiments, the terminating reagent may be an end-capping reagent such that further reaction of the isocyanate group is terminated.

In certain embodiments, acid groups present on the polyurethane may be neutralized via addition of one or more neutralizing reagents such that the polyurethane may be dispersed into water. Non-limiting examples of neutralizing reagent include hydoxides (e.g., potassium hydroxide, lithium hydroxide) and tertiary amines (e.g., triethylamine, tributylamine, ethyldipropylamine, ethyldibutyl amine, diethylpropyl amine, diethylmonobutylamine). In some embodiments, the neutralizing reagent is triethylamine. Likewise, basic groups present on the polyurethane may be neutralized via addition of one or more acidic neutralizing reagents such that the polyurethane may be dispersed into water, such as acetic acid. The amount of neutralizing reagent utilized may be between about 10-150% (e.g., relative to the number of acid groups present on the polyurethane). As described above, adhesives (e.g., as an aqueous dispersion, in an adhesive layer) described herein are generally comprise two or more cured moieties formed via reaction (i.e. curing) of one or more reactive functional groups (e.g., with one or more curing species). For example, in some embodiments, the adhesive is formed via the reaction of at least one reactive functional group, at least two reactive functional groups, at least three reactive functional groups, or at least four reactive functional groups. Each reactive functional group may be the same or different and is generally capable of reacting with one or more curing species, described in more detail below.

In some embodiments, the reactive functional group has a particular dipole moment. In some cases, the use of an adhesive formed via the reaction of one or more functional groups having a relatively high dipole moment (e.g., a dipole moment greater than 2 Debyes) may improve electro-optical performance of an electro-optic display compared to traditional adhesives. Those skilled in the art would be capable of selecting appropriate methods of determining the dipole moment of a reactive group. The dipole moment of a functional group may range between about 2 Debyes and about 6 Debyes. In some embodiments, the dipole moment of a functional group is at least about 2 Debyes, at least about 2.5 Debyes, at least about 3 Debyes, at least about 4 Debyes, or at least about 5 Debyes. For example, a cyclic carbonate group (e.g., comprising a structure as in Formula (XIV)) may have a dipole moment of about 5 Debyes, a pyrrolidone (e.g., comprising a structure as in Formula (XVII)) may have a dipole moment of about 4 Debyes, a nitrile (e.g., comprising a structure as in Formula (V)) may have a dipole moment of about 3.5 Debyes.

The reactive functional group is generally present in the adhesive in an amount ranging between about 5 mole % and about 25 mole % versus the total adhesive composition. In some embodiments, the reactive functional group is present in the adhesive in an amount of at least about 5 mole %, at least about 10 mole %, at least about 15 mole or at least about 20 mole %. In certain embodiments, the reactive functional group is present in the adhesive in an amount of less than or equal to about 25 mole %, less than or equal to about 20 mole %, less than or equal to about 15 mole %, or less than or equal to about 10 mole %. Combinations of the above referenced ranges are also possible (e.g., between about 5 mole % and about 25 mole %).

In some embodiments, the adhesive is cured by the reaction of at least one reactive functional group with at least one curing species (e.g., during curing of the adhesive). In an exemplary embodiment, the adhesive is cured by the reaction of a first reactive functional group with a first curing species (e.g., a first curing step to form a first cured moiety) and a second reactive functional group with a second curing species (e.g., a second curing step to form a second cured moiety). Those skilled in the art would understand, based upon the teachings of this specification, that the reaction of at least one reactive functional group with at least one curing species is not intended to encompass the reaction (e.g., the reaction of a diisocyanate and a secondary reagent such as a diol that forms the polyurethane) which forms the backbone of the adhesive prior to, for example, the addition of an end-capping reagent and/or a chain-extending reagent. That is to say, the reaction of at least one reactive functional group with at least one curing species as described herein generally takes place during curing of the adhesive (e.g., such that the adhesive undergoes a change in one of a mechanical property (e.g., increased Young's elastic modulus), rheological property (e.g., increased viscosity), or the like). However, one or more reactive functional groups may be present in the backbone of the adhesive, as described above, and may react with one or more curing species.

In some embodiments, the adhesive is cured by the reaction of a reactive functional group with a curing species such as a chain-extending reagent, a crosslinking reagent, or combinations thereof. In certain embodiments, the adhesive is cured by the reaction of a first reactive functional group with a curing species such as a second reactive functional group which maybe present on the backbone or on an end-capping reagent. In an exemplary embodiment, the adhesive may be cured by thermoplastic drying of the adhesive material such that two or more reactive functional groups present on the adhesive material react.

In some cases, the curing species comprises a type of reactive functional group, as described above. For example, the curing species may comprise a carboxylic acid group configured to react with a hydroxyl reactive functional group present on the adhesive material backbone or on an end-capping reagent. In an exemplary embodiment, the reactive functional group comprises a carbon-carbon double bond or a carbon-carbon triple bond that reacts with a curing species such as sulfhydryl via a thiolene reaction. In some embodiments, the reactive functional group is capable of reacting with a crosslinking reagent (i.e. crosslinker). That is to say, in some cases, the curing species comprises a crosslinker. Non-limiting examples of suitable crosslinkers include monomers, oligomers, and polymers comprising polyfunctional reactive groups including amine, carbodiimide, epoxy, alcohol, thiol, isocyanate, or the like. Those skilled in the art would be capable of selecting suitable crosslinkers based upon the teachings of this specification. In some embodiments, the curing species is a chain-extending reagent, as described above. In certain embodiments, the reactive functional group is capable of self-crosslinking and/or self-chain extending such as a mono-, di,- or tri-alkoxysilane. In some such embodiments, the curing species may comprise the same type of group as the reactive functional group (e.g., a silane) capable of reacting with the reactive functional group.

In some embodiments, the adhesive is formed by the reaction of one or more reactive functional groups present on the adhesive (e.g., polyurethane) with two or more crosslinkers. For example, in certain embodiments, the adhesive is reacted with a first crosslinker (i.e. a first cure) and a second crosslinker (i.e. a second cure). In some embodiments, the adhesive backbone is reacted with the first crosslinker during a first curing step such as drying and/or lamination of the adhesive. In certain embodiments, the adhesive is then reacted with the second crosslinker during a second curing step. In some embodiments, the first crosslinker and the second crosslinker have different rates of crosslinking with the adhesive (e.g., with one or more reactive functional groups on the adhesive backbone). In certain embodiments, the first crosslinker and the second crosslinker have similar rates of crosslinking with the reactive functional groups present on the adhesive. Advantageously, the use of two or more crosslinkers provides desirable rheological properties to enable effective planarization of the adhesive during lamination and/or drying of the adhesive, and/or low adhesive layer coat weight. In some embodiments, the mechanical properties of the adhesive can be controlled by the second crosslinker (i.e. during the second curing step). In some embodiments, the long term stress reliability of the adhesive can be controlled by the second crosslinker.

Figure 4:
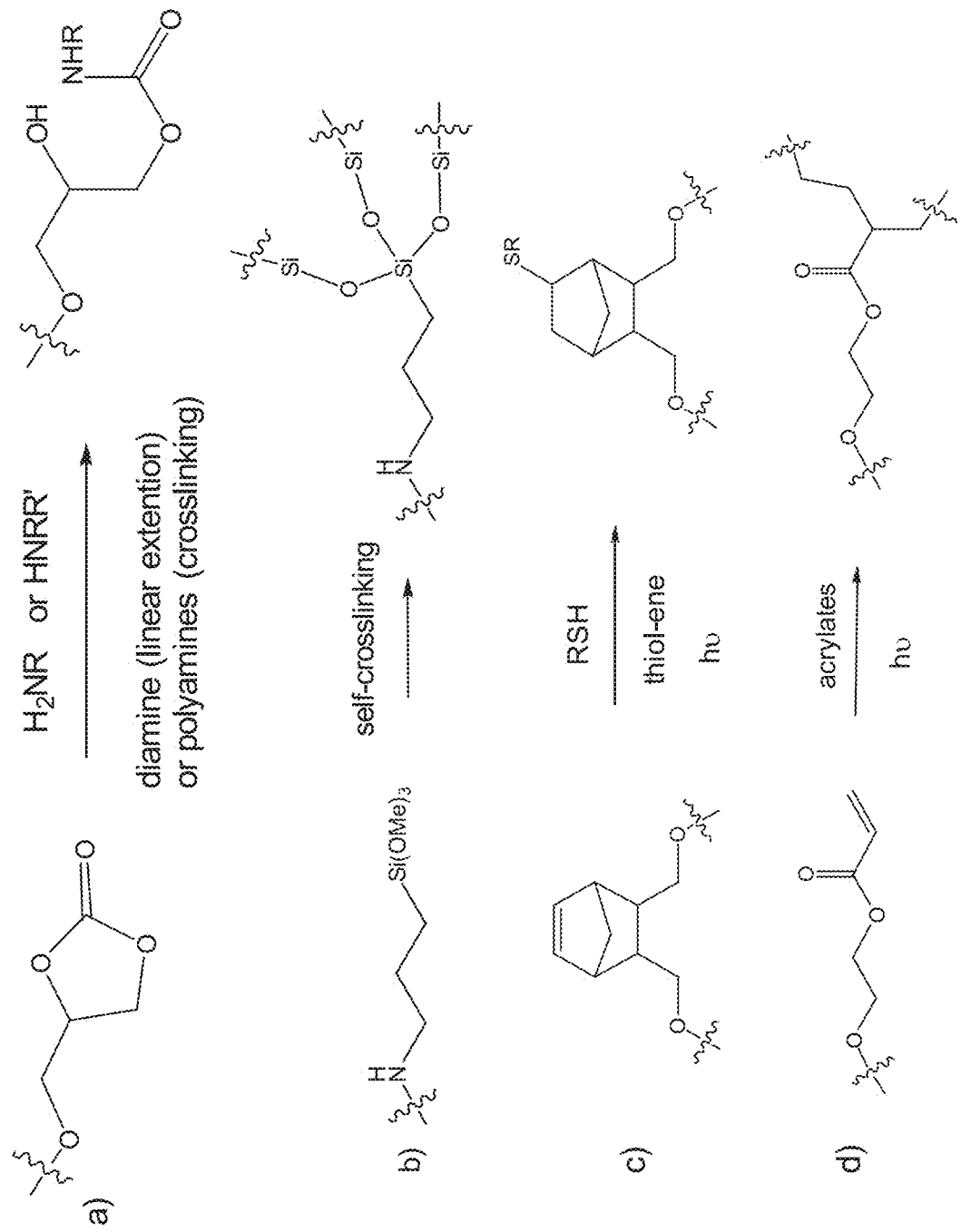
FIG. 4 exemplifies reactions that can be used for curing an adhesive layer in an electro-optic assembly.

In some embodiments, the functional reactive group reacts with the curing species in the presence of a stimulus such as electromagnetic radiation (e.g., visible light, UV light, etc.), an electron beam, increased temperature (e.g., such as utilized during solvent extraction or condensation reactions), a chemical compound (e.g., thiolene), and/or a crosslinker. Exemplary embodiments of types of reactive functional group reactions (e.g., curing steps) are shown in FIG. 4 including diamine or polyamine crosslinking, self-crosslinking, thiolene/UV crosslinking, and UV crosslinking.

While the above description relates to an exemplary polyurethane adhesive composition, incorporation of reactive functionality into other types of adhesive materials will be known to those skilled in the art. For example, epoxy functionality can be incorporated into polyacrylate-based adhesives by use of epoxy containing acrylate monomers, double-bond functionality can be incorporated in alkyd based materials, etc. In some embodiments, as described above, the adhesive may comprise two or more types of adhesive materials (i.e. an adhesive hybrid). For example, in some cases, the adhesive may comprise a polyacrylate such as acrylic (e.g., configured to undergo a first cure by a thermoplastic drying) and a polyurethane (e.g., configured to undergo a second cure via reaction of the polyurethane with a reactive functional group present on the acrylate).

As described above, in some embodiments, the adhesive layer is positioned between the front plane electrode and the backplane electrode, which may apply the electric field needed to change the electrical state of the electro-optic material. That is to say, the electrical properties (e.g., resistivity, conductivity) of the adhesive may change the electric field applied to the electro-optic material. If the resistivity of the adhesive is too high, a substantial voltage drop may occur within the adhesive layer, requiring an increase in voltage across the electrodes. Increasing the voltage across the electrodes in this manner is undesirable, since it may increase the power consumption of the display, and may require the use of more complex and expensive control circuitry to handle the increased voltage involved. By contrast, if the adhesive layer, which may extend continuously across the electro-optic assembly, is in contact with a matrix of electrodes, as in an active matrix display, the volume resistivity of the adhesive should not be too low, or lateral conduction of electric current through the continuous adhesive layer may cause undesirable cross-talk between adjacent electrodes. Furthermore, since the volume resistivity of most materials may decrease rapidly with increasing temperature, if the volume resistivity of the adhesive is too low, the performance of the assembly at temperatures substantially above room temperature is adversely affected. Accordingly, in some embodiments, the volume resistivity of the adhesive may range between about 108 ohm·cm and about 1012 ohm cm, or between about 109 ohm·cm and about 1011 ohm·cm (e.g., at the operating temperature of the assembly around 20° C.). Other ranges of volume resistivity are also possible.

The adhesive layer after curing (e.g., after a first cure and a second cure) may have a particular average coat weight. For example, the adhesive layer can have an average coat weight ranging between about 2 g/m$^2$ and about 25 g/m$^2$. In some embodiments, the adhesive layer has an average coat weight of at least about 2 g/m$^2$, at least about 4 g/m$^2$, at least about 5 g/m$^2$, at least about 8 g/m$^2$, at least about 10 g/m$^2$, at least about 15 g/m$^2$, or at least about 20 g/m$^2$. In certain embodiments, the adhesive layer has an average coat weight of less than or equal to about 2.5 g/m$^2$, less than or equal to about 20 g/m$^2$, less than or equal to about 15 g/m$^2$, less than or equal to about 10 g/m$^2$, less than or equal to about 8 g/m$^2$, less than or equal to about 5 g/m$^2$, or less than or equal to about 4 g/m$^2$. Combinations of the above-referenced ranges are also possible (e.g., between about 2 g/m$^2$ and about 25 g/m$^2$, between about 4 g/m$^2$ and about 10 g/m$^2$, between about 5 g/m$^2$ and about 20 g/m$^2$, between about 8 g/m$^2$ and about 25 g/m$^2$). Other ranges are also possible.

The adhesive layer prior to curing may have a particular average wet coat thickness (e.g., such that the adhesive does not significantly alter electrical and/or optical properties of the electro-optic assembly). For example, the adhesive layer can have an average wet coat thickness ranging between about 1 microns and about 100 microns, between about 1 microns and about 50 microns, or between about 5 microns and 25 microns. In some embodiments, the adhesive layer may have an average wet coat thickness of less than about 25 microns, less than about 2.0 microns, less than about 15 microns, or less than about 12 microns, less than about 10 microns, or less than about 5 microns. In some embodiments (e.g., in embodiments where the adhesive is wet coated directed to an electro-optic material), the adhesive layer may have an average wet coat thickness between about 1 micron and about 50 microns, or between about 5 microns and 25 microns, or between about 5 microns and about 15 microns. In some embodiments (e.g., in embodiments where the adhesive is coated onto a layer and then laminated to an electro-optic material), the adhesive layer may have an average wet coat thickness between about 15 microns and 30 microns, or 20 microns and 25 microns. Other wet coat thicknesses are also possible.

It should be understood that the adhesive layer may cover the entire underlying layer, or the adhesive layer may only cover a portion of the underlying layer.

Further, the adhesive layer may be applied as a laminate, which usually creates a thicker adhesive layer, or it may be applied as an overcoat, which usually creates a layer that is thinner than a laminate. The overcoat layer may utilize a dual curing system where a first cure occurs prior to overcoat such that the adhesive may be coated on the electro-optic material surface (or another surface) and a second cure sets the material after overcoating. The overcoat layer may be rough if the underlying surface is rough and only a thin layer is applied, or the overcoat layer may be used to planarize an underlying rough surface. Planarization may occur in a single step where the overcoat layer is applied to planarize the rough surface, for example, adding sufficient adhesive to fill in any voids and smooth the surface and minimally increase the overall thickness. Alternatively, planarization may occur in two steps where the overcoat layer is applied to minimally coat the rough surface and second coating is applied to planarize. In another alternative, the overcoat layer may be applied to a smooth surface.

Referring again to FIGS. 1C and 1D, in some embodiments, the electro-optic assembly comprises electro-optic material layer 125, capsules 150, and binder 160. In certain embodiments, the binder may also be an adhesive, as described above. For example, the binder may be a polyurethane (e.g., comprising at least one type of end-group).

The electro-optic assembly of the present invention may constitute a complete electro-optic display or only a sub-assembly of such a display (e.g., an electrophoretic display). Representative electrophoretic displays have been described, for example, in U.S. Pat. No. 7,012,735 issued Mar. 14, 2006 which is hereby incorporated in its entirety by reference. A complete electro-optic display generally includes the presence of at least one, and normally two, electrodes to produce the electric field necessary to vary the optical state of the electro-optic material, although in some cases only one of the two electrodes may be a permanent part of the display, with the other electrode being in the form a movable stylus or similar instrument which can be moved over the display to write on the display. For example, in some embodiments, front plane electrode 130 comprises an electrode. In certain embodiments, backplane electrode 110 comprises an electrode. In some cases, the electrode may be light-transmissive. For example, the assembly may have the form of an active matrix display, with the first layer comprising a single continuous light-transmissive electrode extending across multiple pixels, and typically the whole, of the display.

In some embodiments, front plane electrode 130 and/or backplane electrode 110 comprises one or more electrode layers patterned to define the pixels of the display. For example, one electrode layer may be patterned into elongate row electrodes and a second electrode layer may be patterned into elongate column electrodes running at right angles to the row electrodes, the pixels being defined by the intersections of the row and column electrodes. Alternatively, in some embodiments, one electrode layer has the form of a single continuous electrode and a second electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

Referring again to FIGS. 1A-D, front plane electrode 130 may comprise a polymeric film or similar supporting layer (e.g., which may support the relatively thin light-transmissive electrode and protects the relatively fragile electrode from mechanical damage) and backplane electrode 110 comprises a support portion and a plurality of pixel electrodes (e.g., which define the individual pixels of the display). In some cases, the backplane electrode may further comprise non-linear devices (e.g., thin film transistors) and/or other circuitry used to produce on the pixel electrodes the potentials needed to drive the display (e.g., to switch the various pixels to the optical states necessary to provide a desired image on the display).

The electro-optic assembly may have the form of a front plane laminate. In such a front plane laminate, the front plane may comprise a light-transmissive electrically-conductive layer intended to form the front electrode of a final display. The front plane may comprise a polymeric film or similar supporting layer (e.g., which supports the relatively thin electrically-conductive layer and protect it from mechanical damage). In some such embodiments, the electro-optic assembly may include a release sheet, which is removed before the front plane laminate is laminated to the backplane electrode to form the final display.

In some embodiments, the electro-optic material layer comprises an encapsulated electrophoretic media. Referring again to FIGS. 1C and 1D, in some embodiments, electro-optic material layer 125 comprises capsules 150 comprising encapsulated electrophoretic media and binder 160. In some cases, the capsules may comprise encapsulated electrophoretic media comprising numerous small capsules, each of which itself comprises an internal phase containing electrophoretically-mobile particles (e.g., ink particles) suspended in a liquid suspending medium, and a capsule wall surrounding the internal phase. In some such embodiments, the capsules are held within a polymeric binder (e.g., binder 160) to form a coherent layer positioned between two electrodes (e.g., in the front plane electrode and the backplane electrode). In some cases, the walls surrounding the discrete microcapsules in an encapsulated electrophoretic medium may be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet.

In some embodiments, the electrophoretic medium comprises a plurality of capsules, each of the capsules comprising a capsule wall, a suspending fluid encapsulated within the capsule wall and a plurality of electrically-charged particles suspended in the suspending fluid and capable of moving there through on application of an electric field to the medium, the medium further comprising a binder surrounding the capsules.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques. Thus, in some cases, the resulting display may be flexible. Further, because the display medium can be printed (e.g., using a variety of methods), the display itself can be made inexpensively.

In some embodiments, the electro-optic display is a "microcell electrophoretic display". In a microcell electrophoretic display, the charged particles and the fluid are not encapsulated within microcapsules but instead may be retained within a plurality of cavities formed within a carrier medium (e.g., a polymeric film).

Although electrophoretic media are often opaque (e.g., in many types of electrophoretic media, the particles substantially block transmission of visible light through the display) and operate in a reflective mode, many electrophoretic displays can be made to operate in a so-called "shutter mode" in which one display state is substantially opaque and one is light-transmissive.

The adhesives described above may also be used in other electro-optic materials and electro-optic displays known in the art. For example, in some embodiments, the electro-optic material is a solid (e.g., a solid electro-optic display). In some such embodiments, the electro-optic material may comprise internal liquid- or gas-filled spaces. As such, the term "solid electro-optic displays" includes encapsulated electrophoretic displays, encapsulated liquid crystal displays, and other types of displays.

In some embodiments, the electro-optic display is a rotating bichromal member (e.g., a rotating bichromal ball display. In some such embodiments, the display uses a large number of small bodies (typically spherical or cylindrical) which have two or more sections with differing optical characteristics, and an internal dipole. These bodies may be suspended within liquid-filled vacuoles within a matrix, the vacuoles being filled with liquid so that the bodies are free to rotate. The appearance of the display may be changed by applying an electric field thereto, thus rotating the bodies to various positions and varying which of the sections of the bodies is seen through a viewing surface. This type of electro-optic medium is typically bistable.

The term "bistable" is used herein in its conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state may persist for at least several times, for example at least four times, the minimum duration of the addressing pulse required to change the state of the display element. In some cases, some particle-based electrophoretic displays capable of gray scale are stable not only in their extreme black and white states but also in their intermediate gray states. This type of display is generally termed "multi-stable" rather than bistable, although for convenience the term "bistable" may be used herein to cover both bistable and multi-stable displays.

Other electro-optic displays are known in the art and include an electro-optic display using an electrochromic medium, for example an electrochromic medium in the form of a nanochromic film comprising an electrode formed at least in part from a semi-conducting metal oxide and a plurality of dye molecules capable of reversible color change attached to the electrode; electro-wetting displays; and particle-based electrophoretic displays, in which a plurality of charged particles move through a suspending fluid under the influence of an electric field.

The adhesive layer may be formed using suitable techniques known in the art. In some embodiments, the adhesive layer is formed as a film and then applied to the assembly, for example, via lamination. In such embodiments, the adhesive (e.g., comprising an end-capped polyurethane as described herein) may be coated onto a release layer or other substrate (e.g., a front or backplane electrode) and dried using techniques known in the art (e.g., via heating and/or exposure to vacuum). The substrate may comprise indium-tin-oxide (ITO) or a similar conductive coating (e.g., which acts as an electrode layer of the final display) on a plastic film or a release layer (e.g., comprising a flexible polymer). As a specific non-limiting example, the adhesive material may be dispensed (e.g., via use of a die or slot coater) on the substrate. The thickness of the material may be controlled by flowability or amount of material pumped per square area of material. Separately, a backplane electrode, containing an array of pixel electrodes and an appropriate arrangement of conductors to connect the pixel electrodes to drive circuitry, may be prepared. To form the final display, the substrate having the capsule/binder layer thereon may be laminated (e.g., via application of heat and use of a roll laminator) to the backplane electrode using an adhesive.

In an alternative embodiment, a similar process can be used to prepare an electrophoretic display usable with a stylus or similar movable electrode by replacing the backplane electrode with a simple protective layer, such as a plastic film, over which the stylus or other movable electrode can slide. In some such embodiments, the backplane electrode is itself flexible and is prepared by printing the pixel electrodes and conductors on a plastic film or other flexible substrate.

Those of ordinary skill in the art will be aware of suitable conditions for use in the synthetic methods described herein. For example, the adhesive material (e.g., the isocyanate-terminated polyurethane) may be prepared in a reactor wherein the reactants (e.g., diisocyante compound and secondary reagent such as a diol) are combined, mixed, and reacted, either neat or in a solvent, wherein heat may be transferred in to, and away from, the reactor. The synthesis of the adhesive may be conducted in an inert atmosphere (e.g., in the absence of water and in the presence of an inert gas such as nitrogen and/or argon). The reactants may be added in any particular order. The adhesive may be reacted with one or more additional reagents (e.g., end-capping reagent(s), chain-extending reagent(s), neutralizing reagent(s)). In some cases, following a suitable period of time, a dispersing medium such as water is added to the reaction mixture. Following synthesis of the adhesive material, the adhesive material may be dispersed in water (e.g., via addition of water to the reaction mixture or addition of the reaction mixture to water). In some embodiments, the adhesive (e.g., end-capped and/or neutralized) may be chain-extended following dispersion in water.

The adhesive materials described herein can be cured. Curing may include, but not be limited to, the reaction of one or more reactive functional groups with one or more curing species (e.g., such that the adhesive is crosslinked, extended, entangled, etc.) as described herein. In some cases, the adhesive may undergo two or more curing steps (e.g., a first cure and a second cure). That is to say, the adhesive may be cured by reacting a first reactive functional group with a first curing species (i.e. a first cure), and cured further by reacting a second reactive functional group with a second curing species (i.e. a second cure). In some embodiments, the adhesive layer is formed by curing the adhesive such that a first reactive functional group reacts with a first curing species and then, subsequently, curing the adhesive such that a second reactive functional group reacts with a second curing species. The first and second cures may occur at substantially the same time or may occur at substantially different times. The first reactive functional group may be the same or different as the second reactive functional group. The first curing species may be the same or different as the second curing species.

The use of two or more cures (i.e. curing steps) may impart desirable properties to an adhesive. For example, an adhesive having two or more cures may have low coat weights and/or thicknesses as compared to other adhesives, may impart a desirable rheological property in the adhesive (e.g., after the first cure and/or after the second cure), and/or may reduce or prevent the formation of voids and/or defects such that there are substantially no voids and/or defects are present in the adhesive layer after the first cure or after the second cure. The adhesive should generally have sufficient adhesive strength to bind the desired layer(s) to one another. In some cases, the adhesive has sufficient adhesive strength to bind the desired layer(s) to one another after curing (e.g., after the first cure, after the second cure). In some embodiments, the electro-optic assembly is flexible and, therefore, the adhesive may have sufficient flexibility not to introduce defects into the assembly when the assembly is flexed.

Those skilled in the art would be capable of selecting suitable methods for measuring defects in an adhesive such as Orange Peel testing. For example, Orange Peel may be determined using a wave-scan instrument to illuminate the specimen at a 60° angle to the surface, and measure the reflected light intensity collected at the equal but opposite angle from the specimen surface.

The adhesive may have a particular average crossover temperature (Tc, e.g., measured as the temperature at which tan delta=1.0 at 1 Hz) before or after a cure. For example, in some embodiments, the adhesive has an average crossover temperature of between about 0° C. and about 80° C. before a first cure and/or before a second cure. In certain embodiments, the average crossover temperature of the adhesive is less than about 80° C., less than about 60° C., less than about 40° C., less than about 20° C., or less than about 10° C., before a first cure and/or before a second cure. The average crossover temperature may increase after a first cure (before a second cure) but remain between about 0° C. and about 80° C. (e.g., between about 20° C. and about 80° C.). An adhesive with an average crossover temperature as described above may flow and be easily laminated to one or more layers (e.g., an electrode layer, a release layer) and have substantially less defects as compared to an adhesive with a greater crossover temperature. Those skilled in the art would understand that curing (e.g., crosslinking) the adhesive will generally increase the crossover temperature and that, for example, a second cure may increase the crossover temperature to greater than 80° C. For example, in some embodiments, the average crossover temperature of the adhesive after the second cure may be between about 80° C. and about 250° C. In certain embodiments, the average crossover temperature of the adhesive after the second cure is at least about 80° C., at least about 100° C., at least about 150° C., or at least about 200° C. In some cases, the average crossover temperature of the adhesive after the second cure is less than or equal to about 250° C., less than or equal to about 200° C., less than or equal to about 150° C., or less than or equal to about 100° C. Combinations of the above-referenced ranges are also possible.

Adhesive material may be dispensed (for example, by means of a die or slot coater) over the electrophoretic layer or on a release layer. In other embodiments, the adhesive may be directly coated (e.g., via solution techniques) to the electro-optic material (or other underlying layer). The adhesive may then be dried using techniques known in the art (e.g., via heating and/or exposure to vacuum). Additional layers may then be applied on the outer surface of the adhesive.

As a specific example, a dispersion comprising the adhesive material (e.g., a polyurethane dispersed in water) is dispensed (e.g., by means of a die or slot coater) over an electro-optic material layer. The thickness of the liquid material may be controlled, for example, via use of a doctor blade. In some embodiments, the upper surface of the electro-optic material that the adhesive is being applied to may not be planar. In such embodiments, the adhesive may be applied such that the final outer surface of the adhesive is planar or essentially planar.

In an exemplary embodiment, the adhesive material (e.g., comprising a first type of reactive functional group and a second type of reactive functional group) may be coated on at least a portion of a first layer (e.g., indium-tin-oxide (ITO) or a similar conductive coating on a plastic film, a release layer, an electro-optic material layer) and cured (i.e. a first cure) such that the first type of reactive functional group reacts with a first type of curing species (e.g., forming a first cured moiety). In some such embodiments, the adhesive may be contacted with a second layer (e.g., indium-tin-oxide (ITO) or a similar conductive coating on a plastic film, a release layer, an electro-optic material layer) and cured (i.e. a second cure) such that the second type of reactive functional group reacts with a second type of curing species (e.g., forming a second cured moiety). Those of ordinary skill in the art would understand that curing the adhesive (e.g., the first cure, the second cure) generally adheres the adhesive layer to one or more layers. For example, the adhesive may adhere to only one layer. In some cases, the adhesive adheres two layers together. In some cases, the one or more layers may be removed (e.g., a release layer) prior to the second curing and a third layer (e.g., indium-tin-oxide (ITO) or a similar conductive coating on a plastic film, a release layer, an electro-optic material layer) may be contacted with the adhesive (i.e. replacing the removed layer). In some such embodiments, the removed layer may have facilitated decreasing the roughness of the adhesive, and/or protected the adhesive layer (e.g., from physical damage, from contamination) prior to the second cure. One or more additional cures (e.g., a third cure, a fourth cure, etc.) may also be used. For example, in some cases, the adhesive comprises three or more reactive functional groups that may be cured with three or more curing steps.

The film of the adhesive on any substrate may be formed using techniques known in the art. For example, in some embodiments, the adhesive (e.g., a polyurethane) is dispersed in water (or another solvent) and coated onto a layer (e.g., indium-tin-oxide (ITO) or a similar conductive coating on a plastic film, a release layer, an electro-optic material layer). Those of ordinary skill in the art will be aware of techniques for forming a solution coating on a surface, for example, spin coating, spray techniques, printed, die or slot coater, etc. Other additives may be present in the solution. The solution coating may then be dried using techniques known in the art (e.g., heat and/or vacuum), thereby forming the film.

The methods described herein may be carried out at any suitable temperature. In some cases, each reaction (e.g., each curing stage) is carried out at about room temperature (e.g., about 25° C., about 20° C., between about 20° C. and about 25° C., or the like). In some cases, however, each reaction is carried out at temperatures below or above room temperature. In some embodiments, each reaction is carried at a temperature between about 25° C. and about 140° C., about 25° C. and about 75° C., or between about 50° C. and about 100° C.

In some embodiments, one or more of the reactions may be carried out in the presence of a solvent. Alternatively, the reactions may be carried out under neat conditions. Non-limiting examples of solvents include hydrocarbons (e.g., pentane, hexane, heptane), halocarbons (e.g., chloroform, dichloromethane), ethers (e.g., diethylether, tetrahydrofuran (THF), 2-methoxyethyl ether (diglyme), and aromatic compounds (e.g., benzene, toluene) As described herein, in some embodiments, a reaction may also be carried out in water.

For convenience, certain terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1-20 aliphatic carbon atoms. In certain other embodiments, the alkyl, alkenyl, and alkynyl groups employed in the invention contain 1-10 aliphatic carbon atoms. In yet other embodiments, the alkyl, alkenyl, and alkynyl groups employed in the invention contain 1-8 aliphatic carbon atoms. In still other embodiments, the alkyl, alkenyl, and alkynyl groups employed in the invention contain 1-6 aliphatic carbon atoms. In yet other embodiments, the alkyl, alkenyl, and alkynyl groups employed in the invention contain 1-4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl) 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or heterocyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br, —I; —OH; —NO2; —CN; —$CF_2$; —$CH_2CF_3$; —$CHCl_2$; —$CH_2OH$; —$CH_2CH_2OH$; —$CH_2NH_2$; —$CH_2SO_2CH_3$; —C(O)Rx; —$CO_2$(Rx); —CON(Rx)$_2$; —OC(O)Rx; —$OCO_2$Rx; —OCON(Rx)$_2$;

—N(Rx)$_2$; —S(O)$_2$Rx, —NRx(CO)Rx, wherein each occurrence of Rx independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1-20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfonyl, sulfonyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, amino, thioester, polyethylene glycol), and alkyl-substituted amino.

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic; heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)Rx; —CO$_2$(Rx); —CON(Rx)$_2$; —OC(O)Rx; —OCO$_2$Rx; —OCON(Rx)$_2$; —N(Rx)$_2$; —S(O)$_2$Rx; —NRx(CO)Rx wherein each occurrence of Rx independently includes, but is not limited to, aliphatic, alycyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The terms "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3-14 carbon atoms, each of which may be substituted or unsubstituted. Substituents include, but are not limited to, any of the previously mentioned substituents, i.e., the substituents recited for aliphatic moieties, or for other moieties as disclosed herein, resulting in the formation of a stable compound. In some cases, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein may be attached via an alkyl or heteroalkyl moiety and thus also include -(alkyl)aryl, -(heteroalkyl)aryl, -(heteroalkyl)heteroaryl, and -(heteroalkyl) heteroaryl moieties. Thus, as used herein, the phrases "aryl or heteroaryl moieties" and "aryl, heteroaryl, -(alkyl)aryl, -(heteroalkyl)aryl, -(heteroalkyl)heteroaryl, and -(heteroalkyl)heteroaryl" are interchangeable. Substituents include, but are not limited to, any of the previously mentioned substituents, i.e., the substituents recited for aliphatic moieties, or for other moieties as disclosed herein, resulting in the formation of a stable compound.

It will be appreciated that aryl and heteroaryl groups (including bicyclic aryl groups) can be unsubstituted or substituted, wherein substitution includes replacement of one or more of the hydrogen atoms thereon independently with any one or more of the following moieties including, but not limited to: aliphatic; alicyclic; heteroaliphatic; heterocyclic; aromatic; heteroaromatic; aryl; heteroaryl; alkylaryl; heteroalkylaryl; alkylheteroaryl; heteroalkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF$_2$; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)Rx; —CO$_2$(Rx); —CON(Rx)$_2$; —OC(O)Rx; —OCO$_2$Rx; —OCON(Rx)$_2$; —N(Rx)$_2$; —S(O)$_2$Rx; —NRx(CO)Rx wherein each occurrence of Rx independently includes, but is not limited to, aliphatic, alicyclic, heteroaliphatic, heterocyclic, aromatic, heteroaromatic, aryl, heteroaryl, alkylaryl, alkylheteroaryl, heteroalkylaryl or heteroalkylheteroaryl, wherein any of the aliphatic, alicyclic, heteroaliphatic, heterocyclic, alkylaryl, or alkylheteroaryl substituents described above and herein may be substituted or unsubstituted, branched or unbranched, saturated or unsaturated, and wherein any of the aromatic, heteroaromatic, aryl, heteroaryl, -(alkyl)aryl or -(alkyl)heteroaryl substituents described above and herein may be substituted or unsubstituted. Additionally, it will be appreciated, that any two adjacent groups taken together may represent a 4, 5, 6, or 7-membered substituted or unsubstituted alicyclic or heterocyclic moiety. Additional examples of generally applicable substituents are illustrated by the specific embodiments described herein.

The terms "halo" and "halogen" as used herein refer to an atom selected from the group consisting of fluorine, chlorine, bromine, and iodine.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Furthermore, this invention is not intended to be limited in any manner by the permissible substituents of organic compounds.

Examples of substituents include, but are not limited to, halogen, azide, aralkyl, alkenyl, alkynyl, cycloalkyl, hydroxyl, alkoxyl, amino, nitro, sulfhydryl, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

These and other aspects of the present invention will be further appreciated upon consideration of the following Examples, which are intended to illustrate certain particular embodiments of the invention but are not intended to limit its scope, as defined by the claims.

EXAMPLES

Example 1. Synthesis of a Polyurethane Dispersion with Chain Extension Using a Non-Stoichiometric Amount of End Group Monomer, Lower Solvent Content, Catalyzed with Chain Extension after Dispersion—with Glycerin Carbonate (CCARB) End Group (EG) (Adhesive A)

To a 1 l 3-necked flask was added 24.50 g H12MDI (4,4'-Methylenebis(cyclohexyl isocyanate), hydrogenated MDI), 3.29 g of DMPA (dimethylolpropionic acid), 70.80 g poly(propylene glycol) (Mn~2,000) and 7.58 g YmerN120 under a nitrogen atmosphere. 0.057 g of dibutyltin dilaurate was then added and the mixture was heated to 68-71° C. After 5.5 hours, 4.61 g of glycerin carbonate was added to the reaction mixture with stirring for an additional 2 hours at which time 1.44 g N-Methyl-2-pyrrolidone (NMP) was added to lower the viscosity. After an additional 1 hour, triethylamine (2.28 g) was added with stirring for 15 minutes, at which time the prepolymer was dispersed into 167 g deionized water (DIW) at 39° C. The prepolymer was added over 15 minutes. A solution of HMDA (0.631 g) in DIW (10.3 g) was added dropwise to the dispersion over 12 minutes. After an additional 60 minutes a clear, slightly opaque dispersion was isolated.

Example 2. Synthesis of a Polyurethane Dispersion Using a Mixture of End Group Monomers, Catalyzed, with Chain Extension after Dispersion—Glycerin Carbonate/3-Aminopropyl Trimethoxysilane (Adhesive B)

To a 1 l, 3-necked flask under a nitrogen atmosphere was added 76.12 g poly(propylene glycol) (Mn~2,000), 8.806 g of Ymer N1.20 (Perstorp), and 4.193 g of DMPA (dimethylolpropionic acid). 28.6 g H12MDI (4,4'-Methylenebis (cyclohexyl isocyanate), hydrogenated MDI) and 0.060 g of dibutyltin dilaurate was added and the mixture was heated to 75-76° C. for 3.5 hours. Glycerin carbonate (2.946 g) was added and the reaction was heated for an additional 3 hours. TEA (3.71 g) was added and after 15 minutes, the prepolymer was dispersed into 202 g DIW at ~39° C. over 10 minutes. After an additional 5 minutes mixing at 1000 rpm, HMDA (2.09 g) in DIW (15.0 g) and 3-aminopropyl trimethoxysilane (2.216 g) were separately added dropwise to the dispersion over 10 minutes. After an additional 60 minutes a clear, translucent dispersion was isolated.

Example 3. Synthesis of a Polyurethane Dispersion Using a Mixture of End Group Monomers, Catalyzed, with Chain Extension after Dispersion—Glycerin Carbonate/3-Aminopropyl Trimethoxysilane (Adhesive C)

To a 1 l, 3-necked flask under a nitrogen atmosphere was added 65.56 g poly(propylene glycol) (Mn~2,000), 7.866 g of Ymer N120 (Perstorp), and 3.611 g of RMPA (dimethylolpropionic acid). 24.7 g H12MDI (4,4'-Methylenebis(cyclohexyl isocyanate), hydrogenated MDI) and 0.049 g of dibutyltin dilaurate was added and the mixture was heated to 75-76° C. for 3.5 hours. Glycerin carbonate (1.586 g) was added and the reaction was heated for an additional 2.5 hours. TEA. (3.03 g) was added and after 15 minutes, the prepolymer was dispersed into 175 g DIW at ~39° C. over 15 minutes. After an additional 5 minutes mixing at 900 rpm, HMDA (1.26 g) in DIW (15.3 g) and 3-aminopropyl trimethoxysilane (3.13 g) were separately added dropwise to the dispersion over 20 minutes. After an additional 100 minutes a clear, translucent dispersion was isolated.

Example 4. Synthesis of a Polyurethane Dispersion without Chain Extension Using a Stoichiometric Amount of End Group Monomer, in Solvent and Catalyzed, Stepwise Addition of Reagents—Glycerin Carbonate (Adhesive D)

To a 1 l, 3-necked flask was added 33.20 g H12MDI (4,4'-Methylenebis(cyclohexyl isocyanate), hydrogenated MDI) and 91.70 g poly(propylene glycol) (Mn~2,000) under a nitrogen atmosphere. 0.097 g of dibutyltin dilaurate was added and the mixture was heated to 68-70° C. After 4.5 hours, 18.36 g of a mix of 6.985 g of DMPA (dimethylolpropionic acid) and 14.75 g NMP was added directly to the reactor with stirring for an additional 1.5 hours, after which the reactor was cooled and stirring discontinued overnight. The following day, the mix was reheated to 75-77° C. for 5 hours, followed by addition of 8.704 g glycerin carbonate. After an additional 3 hours, heating and stirring were terminated.

114.7 g of the above prepolymer mix was transferred to a second reactor and heated to 70° C. 2.7 g of TEA (triethylamine) was added and stirred for 45 minutes, after which the prepolymer was dispersed into 163.5 g DIW at 45° C. over 30 minutes. After an additional 30 minutes the semi-translucent dispersion was isolated.

Example 5. Synthesis of a Polyurethane Dispersion without Chain Extension Using a Stoichiometric Amount of End Group Monomer—Catalyzed, Inverse Addition of DIW—Glycerin Carbonate (Adhesive F)

To a 500 ml, 3-necked flask was added 35.76 g H12MDI (4,4'-Methylenebis(cyclohexyl isocyanate), hydrogenated MDI), 6.31 g of DMPA (dimethylolpropionic acid) and 98.36 g poly(propylene glycol) (Mn~2,000) under a nitrogen atmosphere. 0.076 g of dibutyltin dilaurate was added and the mixture was heated first to 72° C. for 2 hours then to 80° C. for 4 hours. 9.33 g of glycerin carbonate was added and heated for 1.5 hours after which heating and stirring were terminated. After 15 hours, the mix was reheated to 70-75° C. for 1.5 hours, followed by addition of 3.54 g of TEA (triethylamine). After 45 minutes of mixing 266.0 g of DIW was added over 45 minutes with mixing at 750 rpm with cooling to 38-40° C. The milky-white dispersion was mixed for an additional 1.5 hours and subsequently isolated.

Example 6. Synthesis of a Polyurethane Dispersion with Chain Extension after Dispersion Using a Non-Stoichiometric Amount of End Group Monomer in Solvent, Catalyzed—Glycerin Carbonate EG (Adhesive F)

To a 1 l, 3-necked flask was added 31.82 g H12MDI (4,4'-Methylenebis(cyclohexyl isocyanate), hydrogenated MDI), 5.79 g of DMPA (dimethylolpropionic acid), 87.20 g poly(propylene glycol) (Mn~2,000) and 2.11 g NMP under a nitrogen atmosphere, 0.064 g of dibutyltin dilaurate was then added and the mixture was heated to 78-80° C. After 4.5 hours, 4.56 g of glycerin carbonate and 0.93 g NMP was added to the reaction mixture with stirring for an additional 4 hours at which the reaction was cooled to 70° C., TEA (4.08 g) and NMP (1.9 g) were added with stirring for 20 minutes, at which time the prepolymer was dispersed into 197 g DIW at ~42° C. The prepolymer was added over 10 minutes followed by an additional 5 minutes mixing at 1000 rpm. A 35.4% solution of HMDA in DIW (4.61 g) was diluted with an additional 10.02 g DIW and added dropwise to the dispersion over 15 minutes. After an additional 30 minutes a clear, slightly opaque dispersion was isolated.

Example 7. Synthesis of a Polyurethane Dispersion Using a Mixture of End Group Monomers, Catalyzed, with Chain Extension after Dispersion—Glycerin Carbonate/2-Hydroxyethyl Pyrrolidone (HEP) EG (Adhesive G)

To a 1 l, 3-necked flask under a nitrogen atmosphere was added 76.40 g poly(propylene glycol) (Mn~2,000), 9.284 g of Ymer N120 (Perstorp), and 4.433 g of DMPA (dimethylolpropionic acid). 31.2 g H12MDI (4,4'-Methylenebis (cyclohexyl isocyanate), hydrogenated MDI) and 0.060 g of dibutyltin dilaurate was then added and the mixture was heated to 75-76° C. for 5 hours, after which 4.828 g of a mix of glycerin carbonate (3.35 g) and 2-hydroxyethyl pyrrolidone (3.653 g) was added and stirred for an additional 3.5 hours. TEA (3.61 g) was added and after 15 minutes, the prepolymer was dispersed into 202 g DIW at ~39° C. over 15 minutes followed by an additional 5 minutes mixing at 750 rpm. HMDA (2.09 g) in water (10.0 g) DIW and added dropwise to the dispersion over 10 minutes. After an additional 60 minutes, the clear, translucent dispersion was isolated.

Example 8. Synthesis of a Polyurethane Dispersion Used a Stoichiometric Mixture of End Group Monomers—Glycerin Carbonate/2-Hydroxyethyl Pyrrolidone (Adhesive H)

To a 1 l, 3-necked flask under a nitrogen atmosphere was added 95.50 g poly(propylene glycol) (Mn~1,000), 9.99 g of Ymer N120 (Perstorp), and 7.77 g of DMPA (dimethylolpropionic acid). 54.4 g H12MDI (4,4'-Methylenebis(cyclohexyl isocyanate), hydrogenated MDI) was then added and the mixture was heated to 75-80° C. for 5 hours, after which 10.71 g of a mix of glycerin carbonate (4.43 g) and 2-hydroxyethyl pyrrolidone (10.23 was added and stirred for an additional 2 hours. The temperature was dropped to 55° C. and mixed for an additional 20 hours. The temperature of the reaction was increased to 75° C. at which time TEA (4.58 g) was added. After 30 minutes, the prepolymer was dispersed into 310 g DIW at ~39° C. The prepolymer was added over 30 minutes followed mixing overnight at ambient temperature. A clear, translucent dispersion was isolated.

Example 9. Synthesis of a Polyurethane Dispersion Used a Stoichiometric Mixture of End Group Monomers—Glycerin Carbonate/2-Hydroxyethyl Pyrrolidone EG (Adhesive J)

To a 1 l, 3-necked flask under a nitrogen atmosphere was added 158.3 g poly(propylene glycol) (Mn~2,000), 10.60 g of Ymer N120 (Perstorp), and 10.19 g of DMPA (dimethylolpropionic acid) at 30° C. 58.13 g H12MDI (4,4'-Methylenebis(cyclohexyl isocyanate), hydrogenated MDI) was then added and the mixture was heated to 100° C. for 5.5 hours. The temperature was decreased to 80° C. and 10.60 g of a mix of glycerin carbonate (4.378 g) and 2-hydroxyethyl pyrrolidone (9.552 g) was added and stirred for an additional 1 hour. The temperature was dropped to 55° C. and mixed for an additional 20 hours. The temperature of the reaction was decreased to 70° C. and mixed overnight for an additional 21 hours. TEA (7.15 g) was added and after 15 minutes, the prepolymer was dispersed into 462 g DIW at 50° C. The prepolymer was added over 70 minutes at which time the temperature was increased to 65° C. over 1.5 hours. After overnight mixing at ambient temperature, a clear, translucent dispersion was isolated.

Example 10. Synthesis of a Polyurethane Dispersion Using a Non-Stoichiometric Mixture of End Group Monomers, Catalyzed, with Chain Extension after Dispersion—2-Hydroxyethylpyrrolidone/3-Aminopropyl Trimethoxysilane (Adhesive I.)

To a 1 l, 3-necked flask under a nitrogen atmosphere was added 74.818 g poly(propylene glycol) (Mn~2,000), 8.515 g of Ymer N120 (Perstorp), and 4.054 g of DMPA (dimethylolpropionic acid). 27.435 g H12MDI (4,4'-Methylenebis(cyclohexyl isocyanate), hydrogenated MDI) and 0.057 g of dibutyltin dilaurate was added and the mixture was heated to 76-78° C. for 3.5 hours. 2-Hydroxyethylpyrrolidone (3.034 g) was added and the reaction was heated for an additional 3 hours. TEA (3.628 g) was added and after 10 minutes, the prepolymer was dispersed into 178 g DIW at ~39° C. over 15 minutes. After an additional 5 minutes mixing at 900 rpm, HMDA (2.824 g) in DIW (12.557 g) and 3-aminopropyl trimethoxysilane (1.206 g) were separately added dropwise to the dispersion over 25 minutes. After an additional 90 minutes the dispersion was isolated.

Example 11. Synthesis of a Polyurethane Dispersion Using a Non-Stoichiometric Mixture of End Group Monomers, Catalyzed, with Chain Extension after Dispersion—Glycerin Carbonate/3-Hydroxypropionitrile (Adhesive M)

To a 1 l, 3-necked flask under a nitrogen atmosphere was added 76.532 g poly(propylene glycol) (Mn~2,000), 9.148 g of Ymer N120 (Perstorp), and 4.129 g of DMPA (dimethylolpropionic acid). 30.024 g H12MDI (4,4'-Methylenebis(cyclohexyl isocyanate), hydrogenated MDI) and 0.062 g of dibutyltin dilaurate was added and the mixture was heated to 75-77° C. for 3.5 hours. 3.97 g of a mixture of glycerin carbonate (5,006 g) and 3-hydroxypropionitrile (1.656 g) was added and the reaction was heated for an additional 2.5 hours. TEA (2.75 g) was added and after 15 minutes, the prepolymer was dispersed into 176 g DIW at ~39° C. over 10 minutes. With mixing at 750 rpm, HMDA (1.773 g) in DIW (10.0 g) was added dropwise to the dispersion over 10 minutes. 64.5 g additional DIW was added and after an additional 30 minutes the dispersion was isolated.

Example 12. Synthesis of a Polyurethane Dispersion Used a Non-Stoichiometric Mixture of End Group Monomers, Uncatalyzed, with Chain Extension after Dispersion—Glycerin Carbonate/2-Hydroxyethyl Pyrrolidone EG (Adhesive O)

To a 1 l, 3-necked flask under a nitrogen atmosphere was added 200.3 g poly(propylene glycol) (Mn~2,000), 13.86 g of Ymer N120 (Perstorp), and 14.72 g of DMPA (dimethylolpropionic acid) at 30° C. 95.1 g H12MDI (4,4'-Methylenebis(cyclohexyl isocyanate), hydrogenated MDI) was then added and the mixture was heated to 100° C. for 3.5 hours after which time the polymerization was essentially complete (as monitored by mid IR spectroscopy). The temperature was decreased to 80° C. and 16.84 g of a mix of glycerin carbonate (6.656 g) and 2-hydroxyethyl pyrrolidone (14.419 g) was added and stirred for an additional 16 hours. The temperature was decreased to 78° C. and TEA (10.54 g) was added. After 75 minutes, the prepolymer was dispersed into 625 g DIW at 40 C over 30 minutes, followed by chain extension using a mix of HMDA (5.51 g) in DIW (10.8 g) over an additional 10 minutes. The reaction temperature was increased to 55° C. for 1 hour, after which time heating was terminated and the dispersion mixed under ambient conditions overnight to yield a clear, semi-translucent product.

Example 13. Synthesis of a Polyurethane-Acrylic Hybrid Adhesive A

To a 1 l, 3-necked flask under a nitrogen atmosphere was added 120.0 g poly(propylene glycol) (Mn~1,000), 12.90 g of Ymer N120 (Perstorp), and 9.72 g of DMPA (dimethylolpropionic acid). 68.37 g (4,4'-Methylenebis(cyclohexyl isocyanate), hydrogenated MDI) was then added and the mixture was heated to 100° C. for 4.5 hours. After cooling to 80° C., 11.98 g of a mix of glycerin carbonate (4.2.4 g) and 2-hydroxyethyl pyrrolidone (9.71 g) was added and stirred for 1 hour. The temperature was lowered to 70° C. and mixed for an additional 16.5 hours. The temperature of the heating oil was increased to 77° C. at which time TEA (6.28 g) was added. After 40 minutes, the prepolymer was dispersed into 433 g DIW at ~45° C. over 35 minutes followed by heating to ~50° C. for one hour. A clear, translucent polyurethane dispersion was isolated.

To a 1 l, 3-necked flask was added 265.0 g of the translucent polyurethane dispersion (35.0% solids), 10.7 g of butyl acrylate, 4.3 g of glycidyl methacrylate and 0.42 g of 4,4'-Azobis(4-cyanovaleric acid). The mix was stirred at 500 rpm for 90 minutes at which time it was heated to 70° C. under a nitrogen atmosphere. An additional 54 grams of DIW was added and heating was continued for a total of 21 hours. After cooling to ambient temperature, the thin, whitish dispersion was collected.

Example 14. Synthesis of a Polyurethane-Acrylic Hybrid Adhesive B

To a 1 l, 3-necked flask under a nitrogen atmosphere was added 179.4 g poly(propylene glycol) (Mn~2,000), 6.54 g of Ymer N120 (Perstorp), and 15.02 g of DMPA (dimethylolpropionic acid). 72.91 g H12MDI (4,4'-ethylenebis(cyclohexyl isocyanate), hydrogenated MDI) was then added and the mixture was heated to 100° C. for 4.5 hours. After cooling to 80° C., 15.71 g of a mix of glycerin carbonate (6.36 g) and 2-hydroxyethyl pyrrolidone (13.79 g) was added and stirred for 2.1 hours. 9.65 g of TEA was added and stirred for 2.5 hours, after which time the prepolymer was dispersed into 548 g DIW at ~50° C. over 30 minutes. The dispersion was heated to 60° C. for 1 hour, followed by mixing overnight at ambient temperature. A clear, thin polyurethane dispersion was isolated.

To a 1 l, 3-necked flask was added 251.5 g of the thin polyurethane dispersion (33% solids), 12.7 g of butyl acrylate, 4.7 g of glycidyl methacrylate, 6.3 g of 2-ethylhexyl methacrylate, 32.8 g DIW and 0.28 g of 4,4'-Azobis(4-cyanovaleric acid). The mix was stirred at 400 rpm for 25 minutes at which time it was heated to 70-80° C. under a nitrogen atmosphere for 7.5 hours. 0.12 grams of AIBN was added and mixing was continued at 68-70° C. for 19 hours. After cooling to ambient temperature, the thin, whitish dispersion was collected.

Example 15. General Overcoating Process and Test Display Structures

This example illustrates the general overcoating process and test display structures used in the subsequent examples, unless indicated otherwise.

Previously coated and dried ink, either on a first release substrate (for 3-layer such as shown in FIG. 1D) or electrode substrate (for 2-layer such as shown in FIG. 1C), was coated with adhesive fluid (prepared by mixing the corresponding polyurethane dispersion with a specified amount of cross-linker(s)) to a specified dry coat weight using either a slot-die or linear bar coater. The ink-adhesive coating was then oven dried at a specified temperature and residence time, followed by lamination to either an electrode substrate (for 3-layer) or a release substrate (for 2-layer). For the 3-layer system, the first release substrate was removed from the ink surface which is then laminated to a smooth side laminate (SSL) adhesive (e.g., adhesive layer 140 in FIG. 1D). The 2-layer structure required no further lamination steps prior to construction of test structures. Both intermediate structures (2-layer and 3-layer) are then processed into test display structures by cutting appropriately sized sections, removing the remaining release backing and laminating to the appropriate backplane electrode. Test display conditioning was typically carried out after 25° C. and 50% relative humidity (RH) conditioning, unless alternate conditions are required.

Example 16. Electro-Optical Performance of Polyurethane Adhesives

Table 1 shows to EO states of cyclic carbonate modified polyurethanes overcoated to one or more types of ink layers compared with a comparative laminate control (an aqueous polyurethane dispersion) laminated to an ink layer in a 3-layer structure. Overcoat wet film thicknesses were 4 mil corresponding to a coat weight of ~25 g/m². The 3-layer pixels were conditioned at 25° C. and 50% RH. Adhesive C contains a lower level of cyclic carbonate functionality than Adhesive B. It was observed that significantly improved white state (WS), dark state (DS) and dynamic range (DR) L* values were obtained for the experimental adhesives when compared to the comparative laminate pixel. While the overall dynamic range achieved for the adhesives and control adhesive in Table 1 were relatively similar, it is possible to manipulate the WS and DS by changing the level of cyclic carbonate as indicated. The level of cyclic carbonate functionality in Adhesive A was slightly higher than in Adhesive B and explains why it has slightly poorer WS image stability (see section below). Cyclic carbonate functionality also leads to very low DS L* values as exemplified by Adhesive A.

TABLE 1

| Adhesive | Functionality | Inst WS L* | 30 s WS L* | Init DS L* | 30 s DS L* | Init DR L* | 30 s DR L* |
|---|---|---|---|---|---|---|---|
| A | Cyclic carbonate | 73.4 | 72.8 | 13.0 | 13.7 | 60.4 | 59.1 |
| B | Cyclic carbonate | 73.4 | 73.3 | 16.5 | 16.6 | 56.9 | 56.7 |
| C | Cyclic carbonate | 74.5 | 74.6 | 17.1 | 17.6 | 57.4 | 57.0 |
| control | n/a | | 73.8 | 73.0 | 17.8 | 19.4 | 56.0 | 53.6 |

Figure 5A:
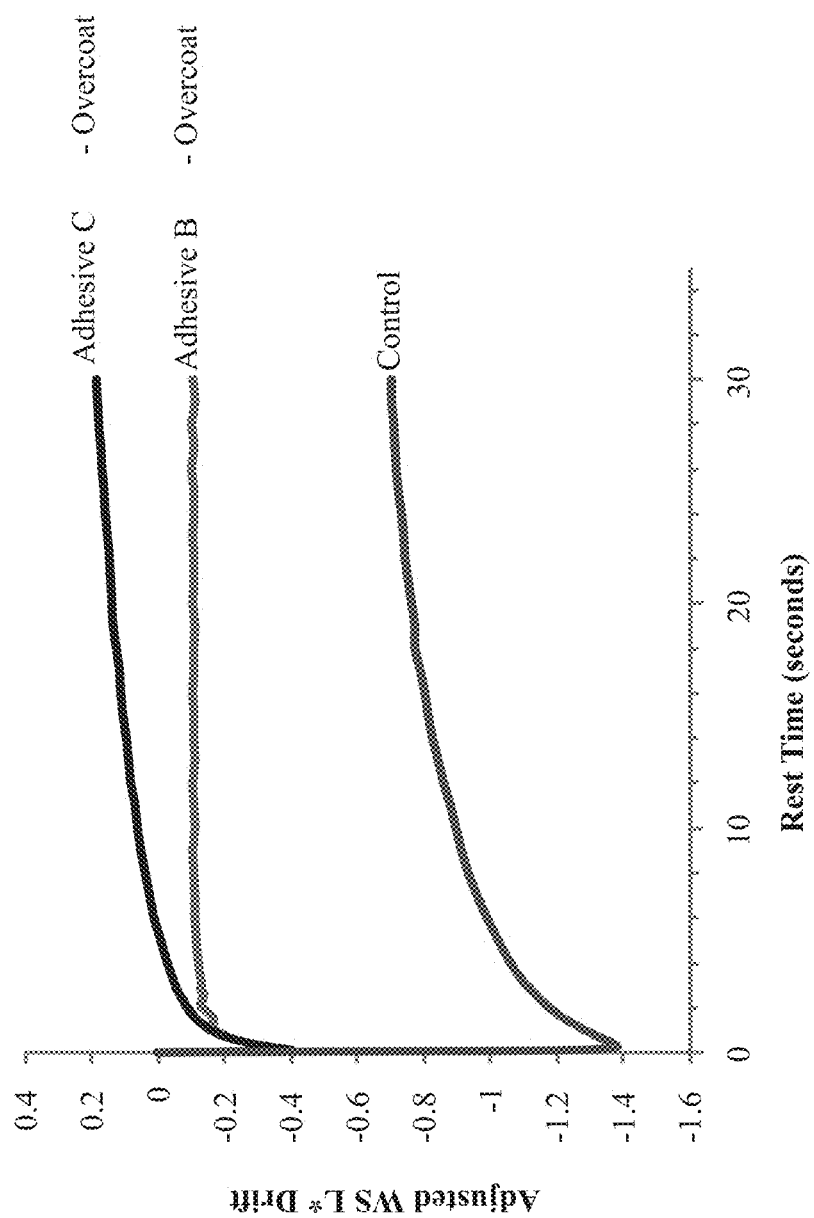
FIG. 5A is a plot of adjusted white state (WS) 30 s image stability of experimental polyurethanes overcoated on an electro-optic layer.
Figure 5B:
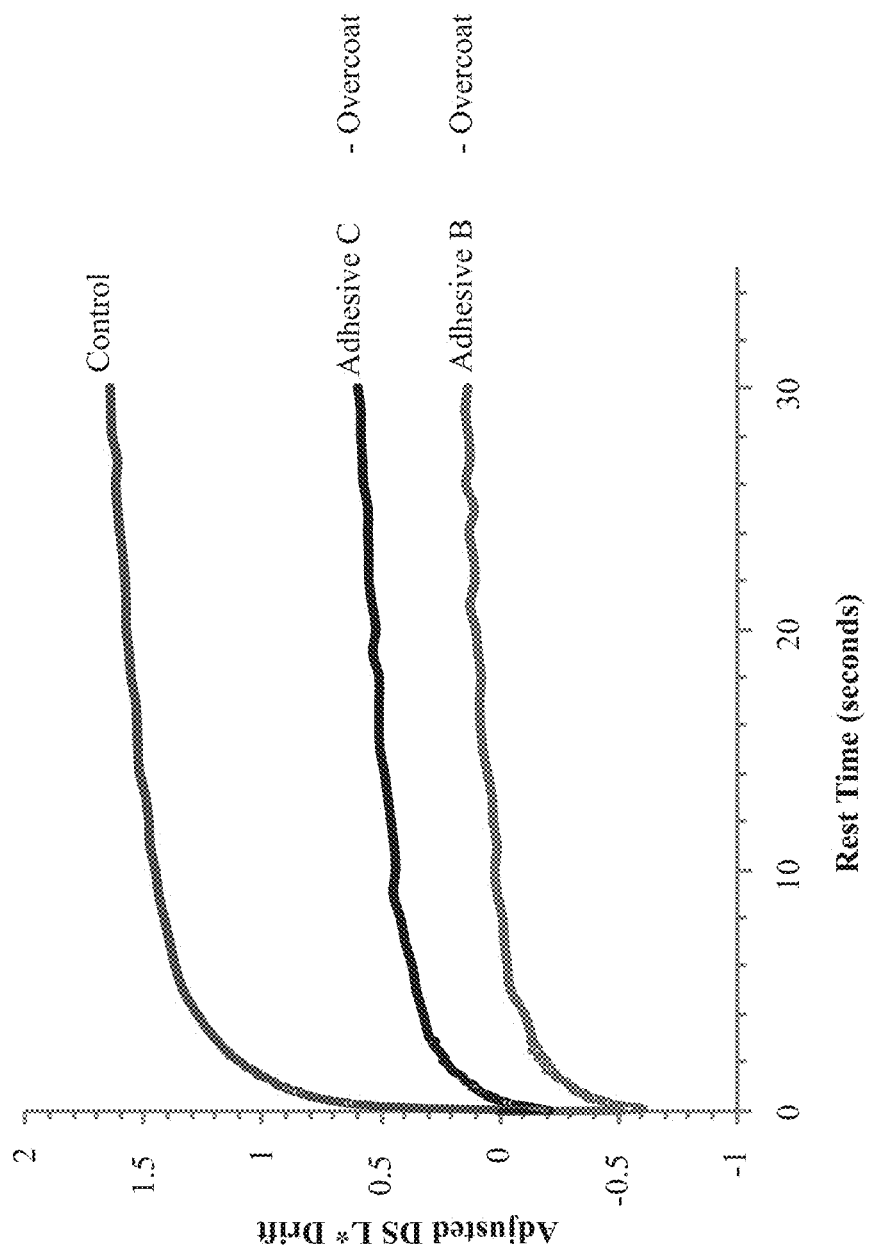
FIG. 5B is a plot of adjusted dark state (DS) 30 s image stability races of experimental polyurethanes overcoated on an electro-optic layer.

FIGS. 5A-5B show adjusted 30 s image stability traces of experimental polyurethanes overcoated to an ink layer compared to the control adhesive laminated over an ink layer. The 3-layer pixels were conditioned at 25° C. and 50% RH. FIGS. 5A-5B illustrate the effect the level of cyclic carbonate functionality has on the WS and DS 30 s image stability. Both adhesives lead to minimal WS kickback and have either stable WS L* (FIG. 5B), or minimal WS L* improvement, simultaneous with improved L* values. Similar improved behavior was observed for the DS L* stability, although the increase was slightly greater then observed for the WS.

Figure 6:
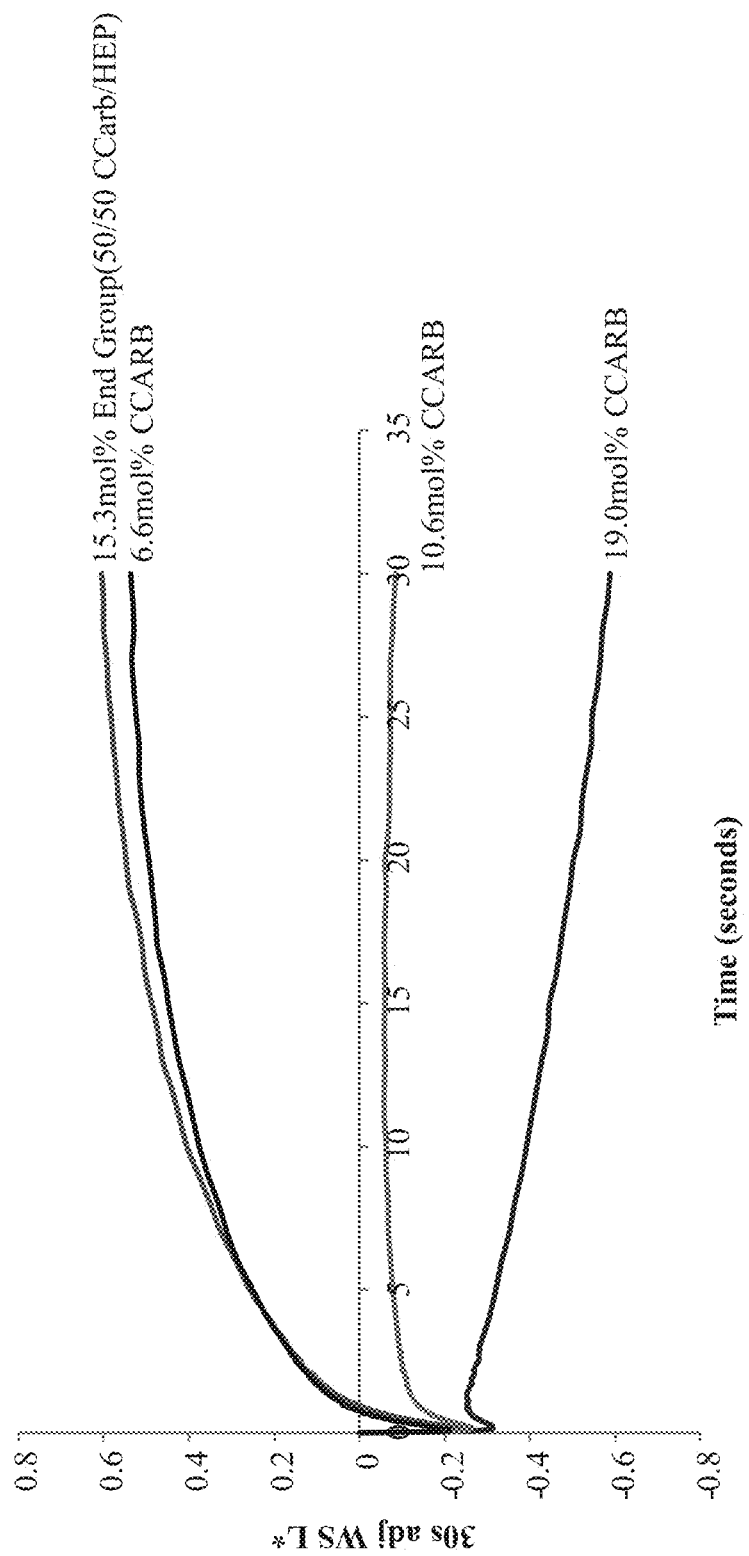
FIG. 6 is a plot of adjusted 30 s white state (WS) image stability for adhesive overcoated to an electro-optic layer with various levels of cyclic carbonate end groups (CCARB).
Figure 7:
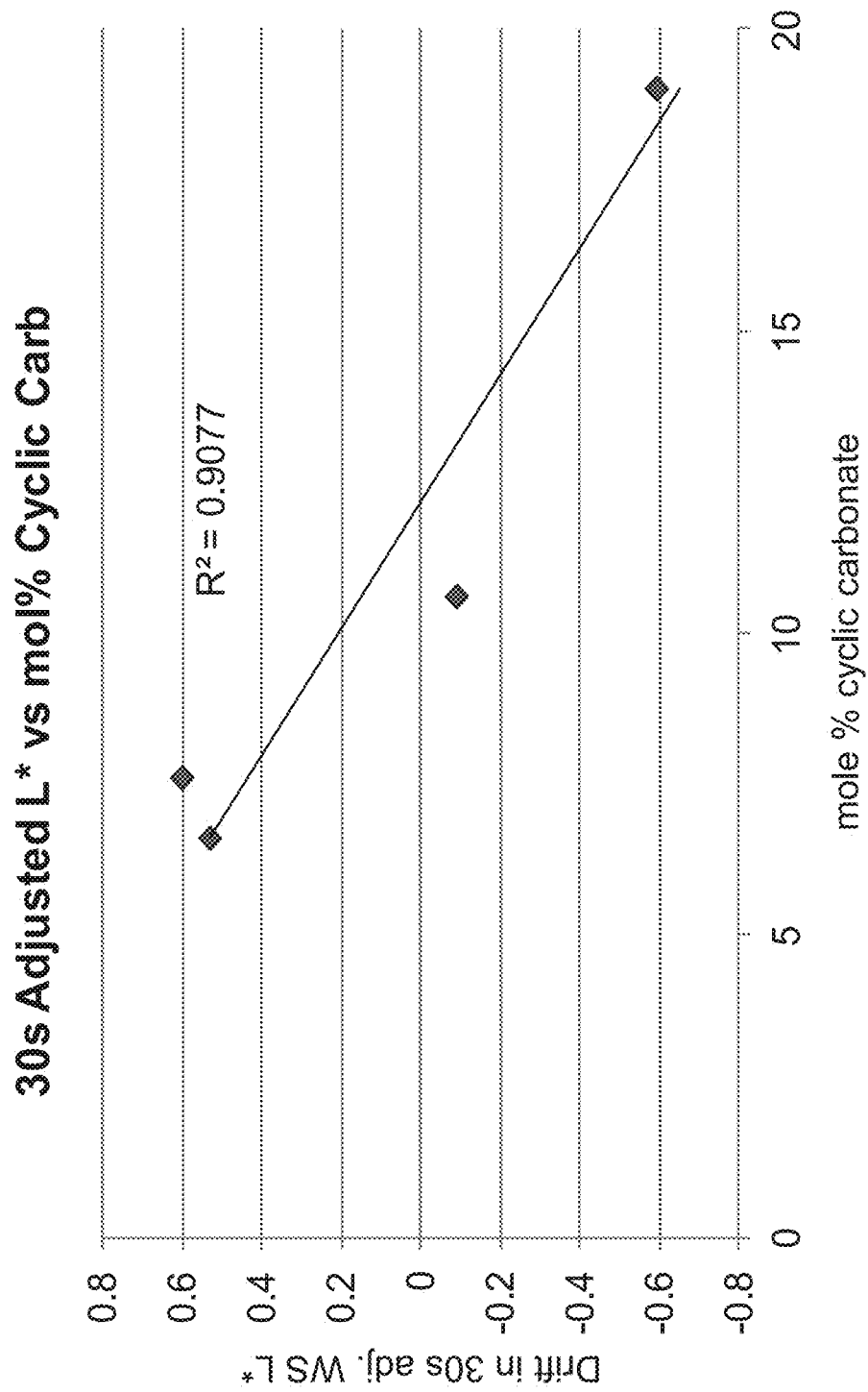
FIG. 7 is a plot of drift in adjusted 30 s WS L* versus mole % cyclic carbonate end cap group for adhesives overcoated to an electro-optic layer.
Figure 8:
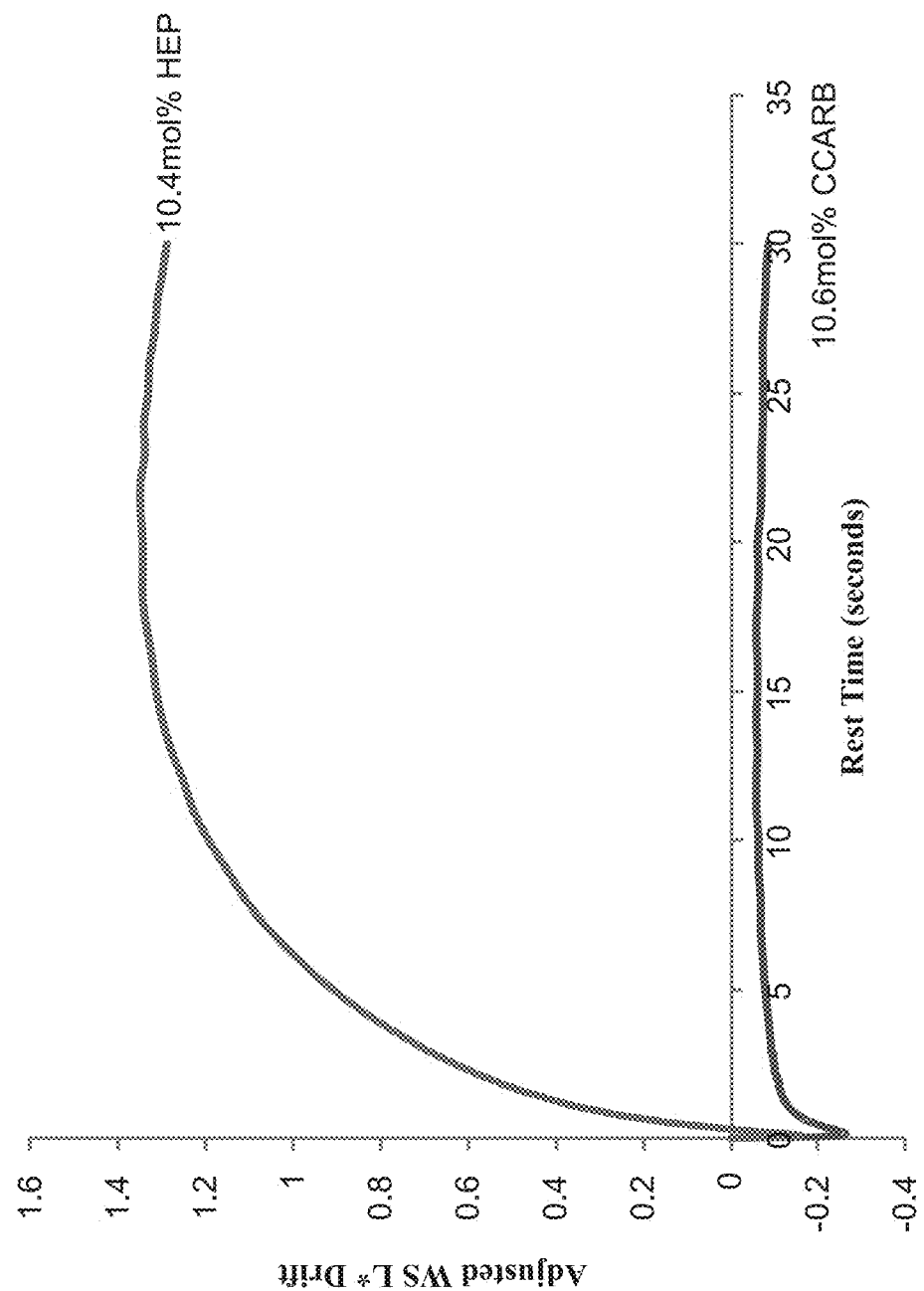
FIG. 8 is a plot of drift in adjusted 30 s WS image stability for pyrrolidone (HEP) and cyclic carbonate (CCARB) adhesives overcoated on an electro-optic layer.

Both the magnitude and the direction of WS L* drift can be controlled by the level of cyclic carbonate functionality incorporated. FIGS. 6-7 illustrate this effect. Low levels of cyclic carbonate lead to an increase in WS L* over time, whereas very high levels result in a decrease in WS L* over 30 seconds. There is a correlation between the mol % level of incorporated cyclic carbonate functionality and the degree of WS L* drift as illustrated in FIG. 8. There was an optimum level of cyclic carbonate functionality around 10 mol %.

Example 17. Effect of End Group Type

FIG. 8 illustrates the effect of pyrrolidone versus cyclic carbonate end-capping groups. Both functional groups are 5-membered heterocycles with either 1 or 2 carbon atoms separating the ring from the oxygen bonded to the polyurethane chain. At equimolar levels of incorporation into the polyurethane backbone, significantly better image stability was observed for the cyclic carbonate containing polyurethane, clearly illustrating the effect of functionality type.

This effect on $t_0$ states is shown in Table 2. In the Adhesive B series, the pixel laminated with the comparative laminate (control) exhibits an overall WS loss from the initial states to 30 s and the pixel overcoated with the pyrrolidone containing adhesive exhibits an overall WS improvement. The 3-layer pixels were conditioned at 25° C. and 50% RH and are from two separate experiments as indicated. The pixel overcoated with the cyclic carbonate containing adhesive has a stable WS while at the same time exhibiting slightly improved WS L* to the laminate system. A similar observation was made in the Adhesive A series, although in this case the WS L* offset for the laminate pixel was lower. The improved DR L* values for all overcoated pixels containing cyclic carbonate functionality, relative to control, were due to significantly improved DS L* values.

TABLE 2

| Adhesive | Prime End Group | Init WS L* | 30 s WS L* | Init DS L* | 30 s DS L* | Init DR L* | 30 s DR L* |
|---|---|---|---|---|---|---|---|
| B | Cyclic carbonate | 73.1 | 73.1 | 13.9 | 14.9 | 59.2 | 58.2 |
| L | Pyrrolidone | 73.0 | 73.6 | 14.5 | 16.1 | 58.5 | 57.5 |
| control | n/a | 72.7 | 72.1 | 16.2 | 17.0 | 56.5 | 55.1 |
| A | Cyclic carbonate | 74.0 | 74.2 | 13.9 | 14.9 | 60.1 | 59.3 |
| control | n/a | 73.4 | 73.2 | 16.3 | 17.1 | 57.1 | 56.1 |

Figure 9:
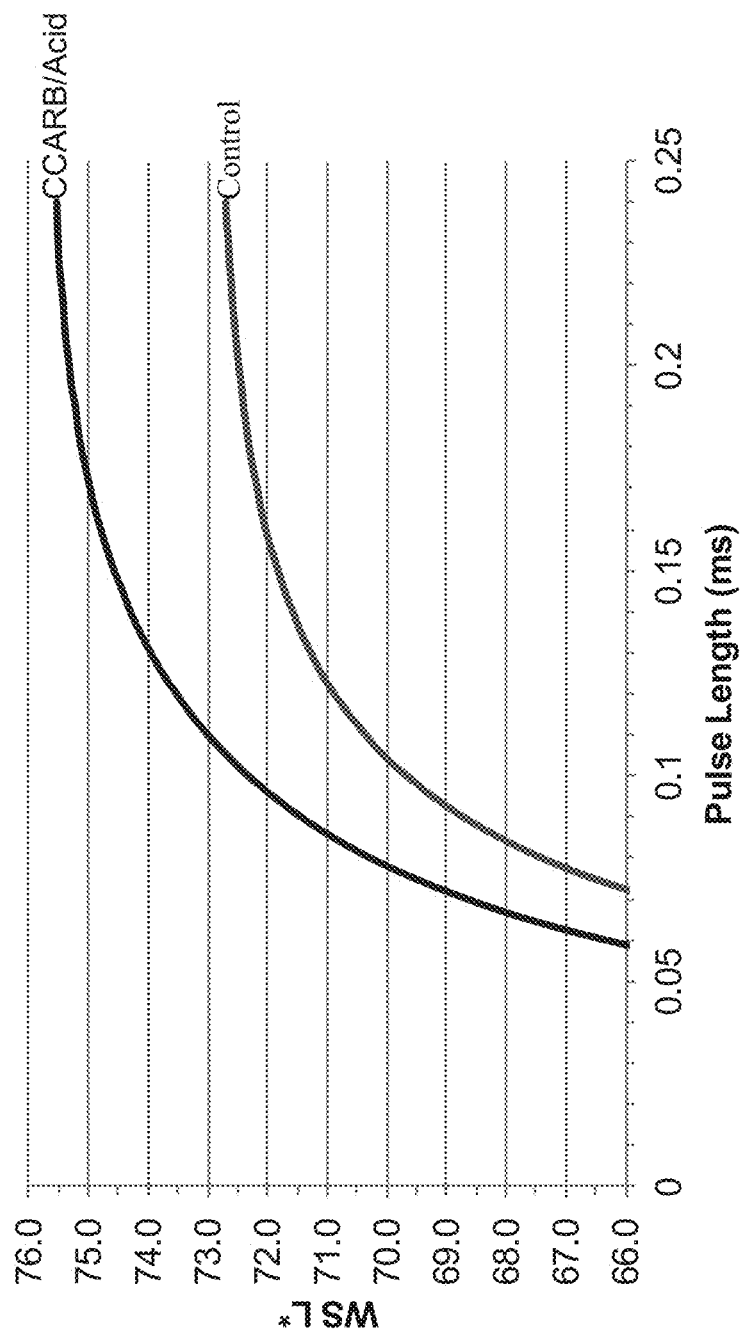
FIG. 9 is a plot of WS L* versus pulse length for a standard aqueous polyurethane dispersion adhesive (control) and a cyclic carbonate polyurethane adhesive with acid functionality (CCARB/Acid). Both adhesives were overcoated on an electro-optic layer compared with an aqueous polyurethane dispersion (control) laminated to the same ink, according to one set of embodiments.

FIG. 9 shows the 240 ms WS L* pulse trace for adhesive M overcoated to an ink layer compared with the comparative laminate laminated to the same ink. Adhesive M incorporates cyclic carbonate functionality as well as acid functionality for curing. Both adhesives were coated to ~25 g/m2 utilizing 5 mil thickness electrode. A 3 L* boost in WS was observed for the overcoated ink (with equal DS L* traces).

Example 18. Direct to ITO Ink Structures

Ink was coated to a transparent, flexible substrate coated with indium tin oxide. Subsequently, aqueous adhesive formulation containing dispersed polyurethane and carbodiimide crosslinker (to react with carboxyl functionality in the polyurethane) was bar coated and dried in cross draft ovens at elevated temperature. The level of carbodiimide crosslinker was matched to the level of acid functionality present in the polyurethane such that the acid/carbodiimide functionality was about 1:1.

Table 3 shows initial dynamic range δL* (relative to the comparative laminate) that vary with end group modification. It was observed that comparable initial properties are obtained with carbonate modified polyurethanes relative to the comparative (Control) laminated ink.

TABLE 3

|  | Application | δ (DR) |
|---|---|---|
| CYANO | Overcoat | −3 |
| PYRROLIDONE | Overcoat | −1 |
| nBUTYL | Overcoat | −3 |
| CARBAMATE | Overcoat | −2 |
| CARBONATE | Overcoat | 0 |
| Control | Laminate | 0 |

Figure 10:
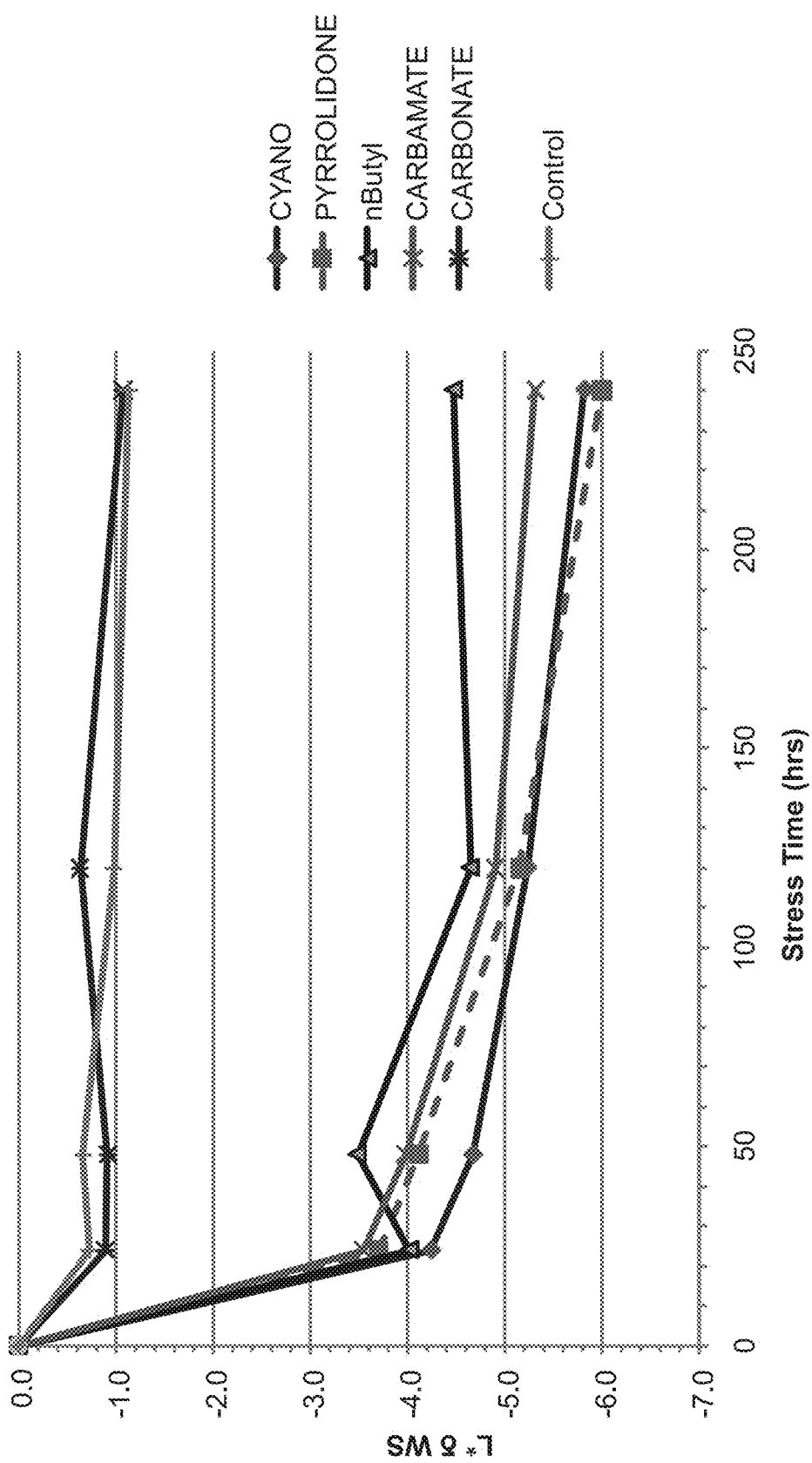
FIG. 10 is a plot of White State (WS) drift in (L*δWS) versus electrical stress time at 25° C. for polyurethane adhesive layers comprising a variety of functional groups.

FIG. 10 demonstrates WS L* loss over time during 25° C. electrical stress testing of overcoated adhesives on machine coated DTI open ink. Data was relative to t=0 for each individual adhesive. All overcoated adhesives were crosslinked with a carbodiimide crosslinker at a 1:1 acid:carbodiimide equivalency. The comparative laminate (control) was not crosslinked and contained 180 ppm ionic dopant. It was unexpectedly found that incorporation of pendant cyclic carbonate functionality resulted in enhanced 25° C. stress degradation resistance that is comparable to the comparative laminated ink. This behavior was not observed for other end group modified polyurethanes studied.

Example 19. Improved Low Temperature Performance

Another performance improvement observed with carbonate modified polyurethanes was improved low temperature performance, i.e., switching behavior and resulting L* values. Table 4 lists EO data accumulated at 0° C. The carbonate modified adhesive exhibited the best switching behavior at 0° C.

TABLE 4

|  | WS L* 0° C. | DS L* 0° C. | DR L* 0° C. |
|---|---|---|---|
| CYANO | 66.1 | 31.3 | 34.8 |
| PYRROLIDONE | 66.8 | 33.3 | 33.4 |
| BUTYL | 61.7 | 34.9 | 26.8 |
| CARBAMATE | 64.3 | 33 | 31.3 |
| CARBONATE | 69.2 | 21.4 | 47.7 |

Examples 20-23 generally relate to low coat weight adhesive films.

Example 20. Low Coat Weight Overcoating

Surprisingly, by manipulating the rheology of the polyurethane and the type and rate of the cure process, overcoming of ink and subsequent void-free lamination to electrode substrates may be achieved using relatively low adhesive coat weights. Generally, for adhesives that are utilized in commercial and advanced prototype displays, defects such as lamination voids and orange peel increase as the coat weight decreases and at least ~25 g/m2 of material is required to achieve acceptable performance. The adhesives described herein substantially reduce the amount of material required for void-free lamination and reduced orange peel.

Table 5 lists coat weight, void count and orange peel for ink-adhesive-electrode structures in which adhesive N, containing carboxylic acid, cyclic carbonate and acrylate functionality, was overcoated to an ink layer on a release substrate by using a linear bar coater. A dry coat weight of 6 g/m2 (approximately 1 mil wet coat thickness) was achieved by using a 30% solids aqueous adhesive formulation. As the data indicates, near void-free lamination of the electrode to the ink surface is achieved. In addition, orange peel values are within the range typically observed for current commercial products that have adhesive coat weights of 25 g/m2. The characteristics of the adhesive were selected to balance adhesive Tc (e.g., to influence how the material flows into the surface of the ink where thinner films require reduced amounts of adhesive, generally requiring lower adhesive Tc values in order to planarize the electro-optic layer before curing), the extent of crosslinking (acid-carbodiimide), as well as solvent evaporation during the first cure to enable flow with filling of the rough ink surface and subsequent void-free lamination (e.g., after the second cure) to both 5 mil and 1 mil electrode substrate.

TABLE 5

| Electrode thickness | Overcoat Weight (g/m²) | Void Count per Size Range (um) | | | | Orange Peel (Wc) |
|---|---|---|---|---|---|---|
| | | 30-100 | 100-125 | 125-150 | 150+ | |
| 5 mil | 6 | 2-3 | 0 | 0 | 0 | 5-6 |
| 1 mil | 6 | 2-3 | 0 | 0 | 0 | 26-30 |

Table 5 shows the coat weight, void count and orange peel values for lamination of 5 mil and 1 mil electrode to adhesive N overcoated to an ink layer open ink-on-release.

Figure 11:
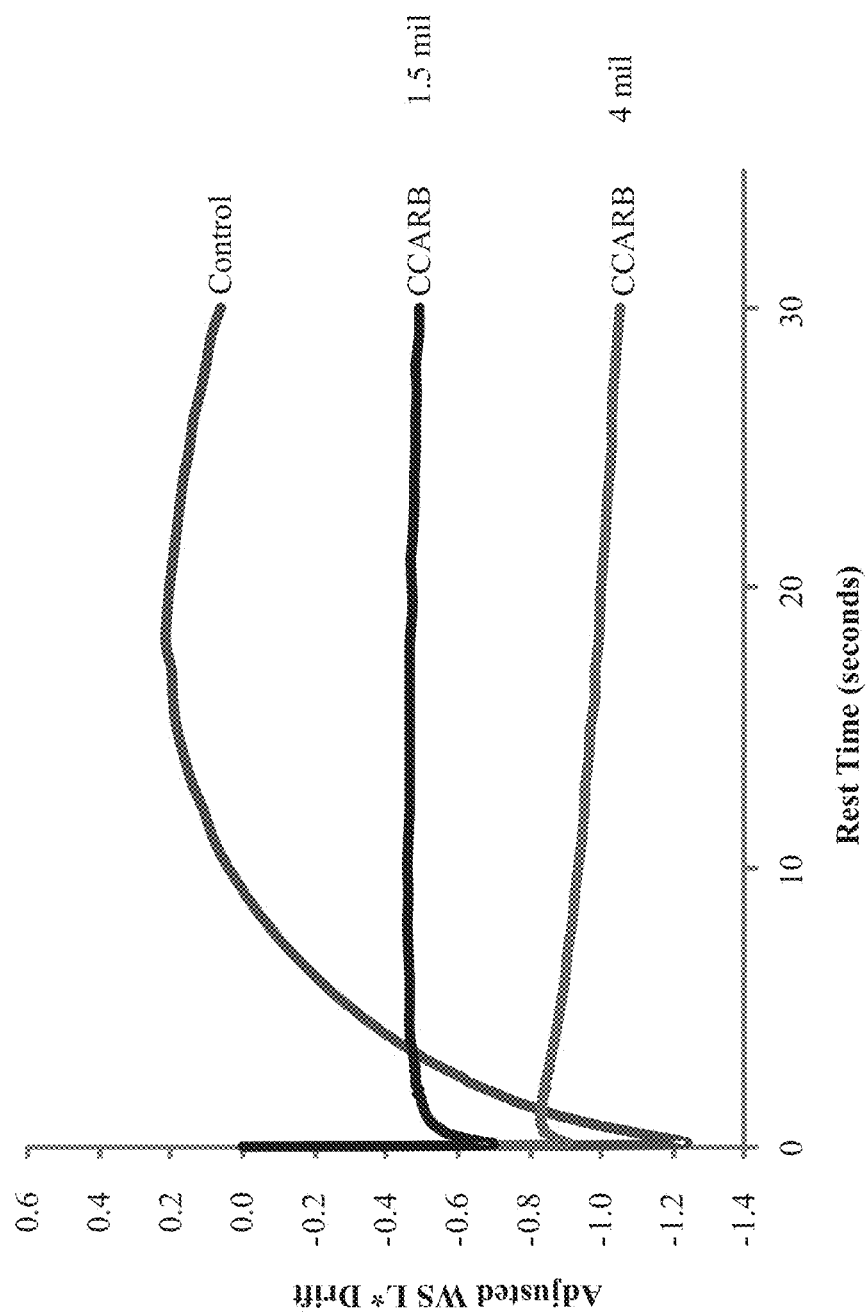
FIG. 11 is a plot of WS 30 second adjusted image stability traces for cyclic carbonate polyurethane (CCARB) coated at low and high dry adhesive coat weights compared to a commercially-available aqueous polyurethane dispersion adhesive coated at approximately 4 mil.

An additional example illustrating the benefit of combining functionality that improves electro-optical states with a dual curing process that achieves low coat weights is illustrated in Table 6. In this case adhesive M is overcoated to prototype ink on release at a low and high wet film build (4 mil wet corresponds to ~20-25 g/m2 and 1.5 mil wet corresponds to ~8-10 g/m2), followed by lamination to 5 mil electrode substrate and construction into 3-layer graphite pixels. As can be seen from the data, and the accompanying image stability traces in FIG. 11, improved WS L* and DR L* values were obtained with the adhesive M: lower coat weights for the overcoated material lead to better WS image stability, lower levels of kickback and improved electro-optical states. Although the initial DS L* values were higher than observed for the comparative laminate control, the lower levels of DS SE result in near equivalent 30 second DS L* values.

TABLE 6

| Adhesive | Wet Coat Thickness | Coat Process | Init WS L* | 30 s WS L* | Init DS L* | 30 s DS L* | Init DR L* | 30 s DR L* |
|---|---|---|---|---|---|---|---|---|
| Control | n/a | Laminate | 73.7 | 73.6 | 16.9 | 19.7 | 56.8 | 54.0 |
| M | 4 mil | Overcoat | 75.5 | 74.4 | 20.3 | 20.3 | 55.2 | 54.0 |
| M | 1.5 mil | overcoat | 75.5 | 74.9 | 19.4 | 20.0 | 56.2 | 54.9 |

Table 6 show 25° C. electro-optical data for adhesive M overcoated to prototype ink on release at a low and high wet film build illustrating the impact of electro-optically active functionality and a low coat weight adhesive. 3-Layer, pixels were cured at 50° C./50% RH and reconditioned to 25° C./50% RH prior to measurement.

Example 21. Lamination to Open Ink

In this example, the adhesive was applied to either an electrode substrate (for example, a 3-layer structure) or to a release substrate (for example, a 2-layer structure) followed by lamination to the ink surface. Secondary curing to achieve final mechanical and electro-optical property development to both interfaces was then carried out.

Adhesives B (acid, cyclic carbonate, silane functionality) and Adhesive L (acid, pyrrolidone, silane functionality), both mixed with a carbodiimide crosslinker (for stage I curing (the first cure), was coated to release substrate at 1.5 mil wet film build (approximately 7-9 g/m2 dry adhesive), dried in a cross draft oven and laminated to prototype ink on 1 mil electrode substrate. The adhesive surface was directly laminated to a carbon backplane, or to commercial SSL, which was then laminated to a carbon backplane. Stage II curing (the second cure) is afforded by the incorporated trimethoxysilane functionality via condensation mechanisms. As a comparative example, open ink on 1 mil electrode substrate was laminated to SSL (2 layers each at 5 g/m2 adhesive weight; 10 g/m2 total coat weight). The SSL was minimally crosslinked thereby allowing a direct comparison of adhesive rheology and effects of dual curing on lamination quality. Some void formation was evident (indirectly observed via switching effects) in the comparative example whereas the pixels with adhesive B exhibited no evidence of lamination voids when switched. Furthermore, as shown in Table 8, improved WS L* values were obtained with the adhesive

TABLE 7

| SSL | Adhesive | End Group | Inst WS L* | 30 s WS L* | Init DS L* | 30 s DS L* | Init DR L* | 30 s DR L* |
|---|---|---|---|---|---|---|---|---|
| None | B | Cyclic carbonate | 74.9 | 74.9 | 15.4 | 17.4 | 59.5 | 57.5 |
| 1 layer | B | Cyclic carbonate | 74.9 | 75.0 | 15.3 | 17.4 | 59.6 | 57.6 |
| None | L | Pyrrolidone | 75.0 | 75.0 | 15.1 | 17.1 | 59.9 | 57.9 |
| 1 layer | L | Pyrrolidone | 74.7 | 74.7 | 15.2 | 17.6 | 59.5 | 57.2 |
| 2 layer | Control | n/a | 73.9 | 73.3 | 15.3 | 18.1 | 58.6 | 55.2 |

Table 7 shows initial and 30 s L* values for 2- or 3-layer DTI pixels of B and Adhesive L adhesive laminated to prototype ink on 1 mil electrode substrate, compared with 2-layer pixels made using two layers of commercial SSL (at 5 g/m2 adhesive weight; 10 g/m2 total adhesive coat weight) laminated to prototype ink on 1 mil electrode. Experimental adhesives were coated to ~1.5 mil wet bar height on 1 mil electrode, corresponding to ~7-9 g/m2 dry adhesive.

An additional example of electro-optical improvements that can be obtained by laminating the adhesives is shown in Table 8. In this case the adhesive was coated at 3.5 mil wet coat thickness to 5 mil electrode substrate, dried and laminated to prototype ink on release. A comparative aqueous polyurethane dispersion (control) was utilized for comparison. A WS L* of 76 and a DS L* of 18 is observed for the adhesive at 30 seconds.

TABLE 8

| Adhesive | Process | Init WS L* | 30 s WS L* | Init DS L* | 30 s DS L* | Init DR L* | 30 s DR L* |
|---|---|---|---|---|---|---|---|
| M | Laminate | 75.7 | 75.9 | 16.3 | 17.7 | 59.4 | 58.2 |
| control | Laminate | 74.9 | 74.9 | 16.0 | 18.2 | 58.9 | 56.7 |

Table 8 shows 25° C. t=0 electro-optical data for adhesive M laminated to prototype open ink compared with the comparative control laminated to the same ink. Pixels are 3-layer graphite conditioned at 25° C. and 50% RH.

Example 22. Hybrid Adhesive Curing

Figure 12:
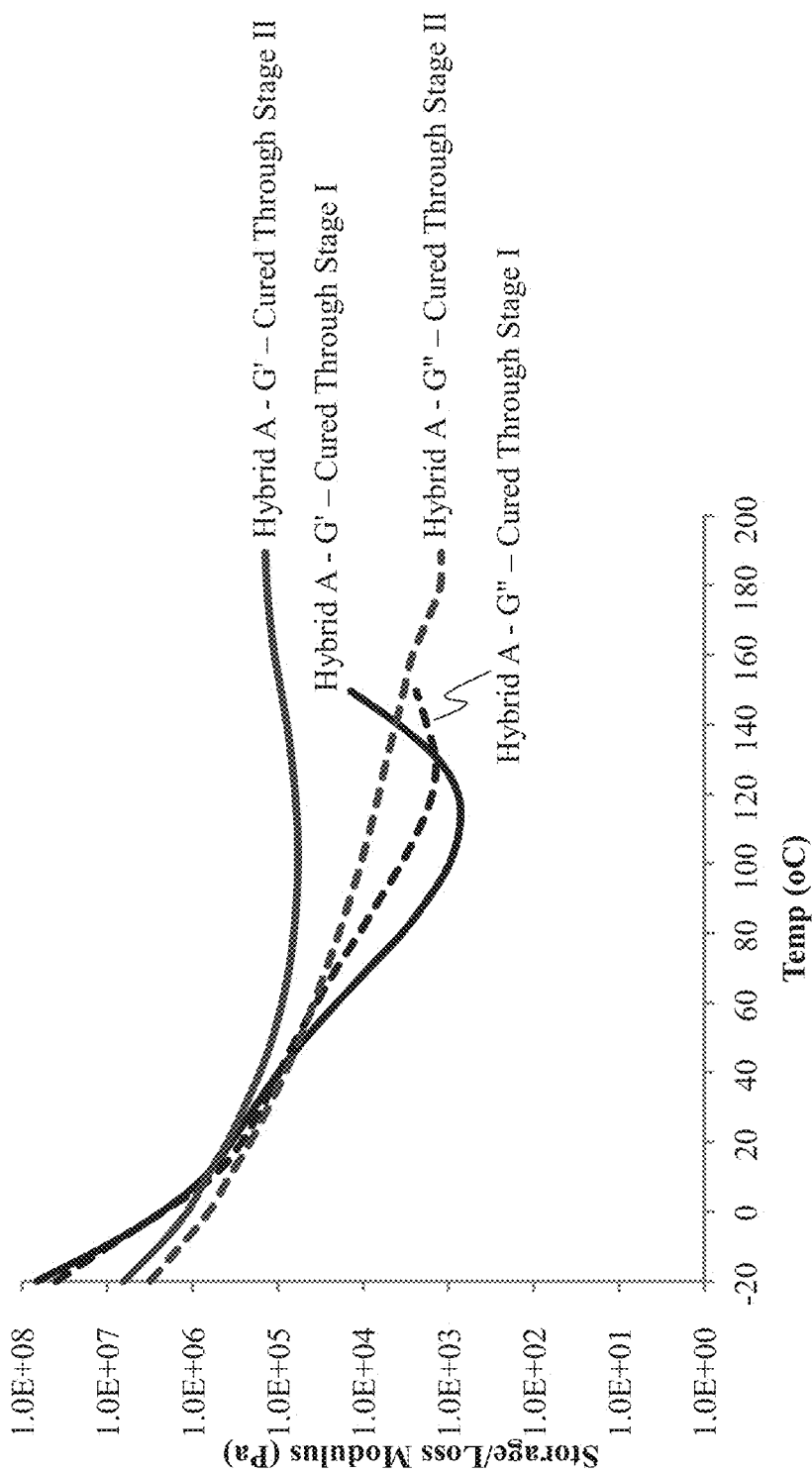
FIG. 12 shows Storage (G') and Loss (G") shear modulus curves at 1 Hz for hybrid polyurethane adhesives cured through stage I ("first cure") and stage II ("second cure").

The rheology profile of a hybrid adhesive A is shown in FIG. 12. Both pre-cure and post-cure curves are illustrated. In FIG. 12, the shear storage modulus (G') and shear loss modulus (G") are plotted as a function of temperature for stage I (thermoplastic dry) and stage II (acid-epoxy covalent crosslinking) cured adhesives. The combination of a high temperature plateau in the G', combined with a relatively low tan delta for the crosslinked (cured through stage II) material illustrates the efficiency of curing. The crossover temperature (Tc) of polyurethanes, i.e., the temperature at which tan delta (ratio of loss modulus to storage modulus) is equal to 1 and the material begins to exhibit more viscous flow, is utilized to estimate the relative ease with which the adhesive planarizes the ink surface during drying and lamination. As can be seen in the plot of tan delta (not shown), the stage I cure (a thermoplastic drying), hybrid adhesive A has a Tc approximately 10-15° C. higher than the parent, unmodified polyurethane, making it generally suitable for use as a planarization adhesive at low coat weights. Improved rheology was achieved with the hybrid adhesive, whereas a significantly higher coat weight adhesive layer was required in order to efficiently planarize the ink surface using the commercial adhesive.

Figure 13:
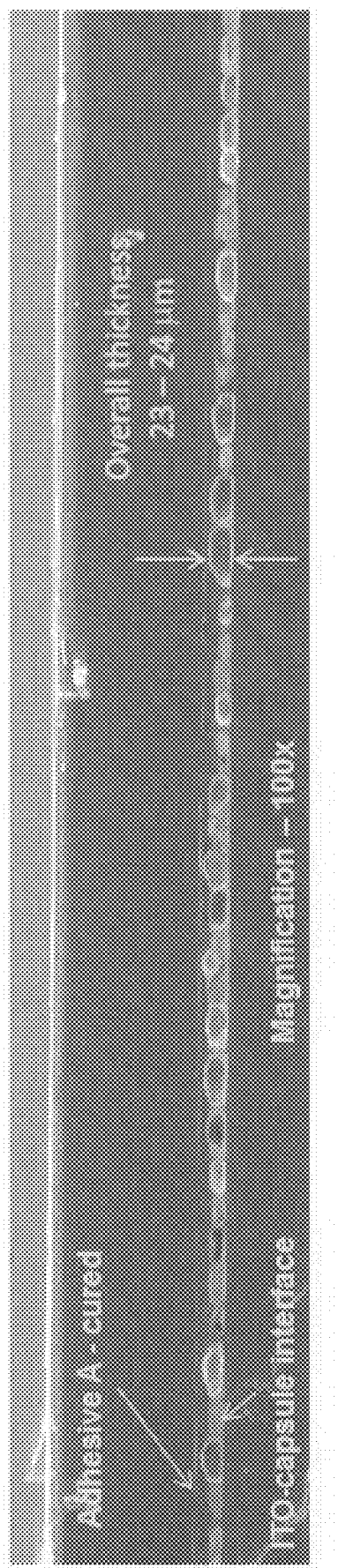
FIG. 13 is an SEM micrograph at 100× magnification of an electrode/electro-optic layer/adhesive layer stack with a hybrid adhesive coated at 8 g/m$^2$, after curing. This micrograph illustrates that the adhesive layer can be applied at good planarity and with minimal increase in the overall thickness of the stack.
Figure 14:
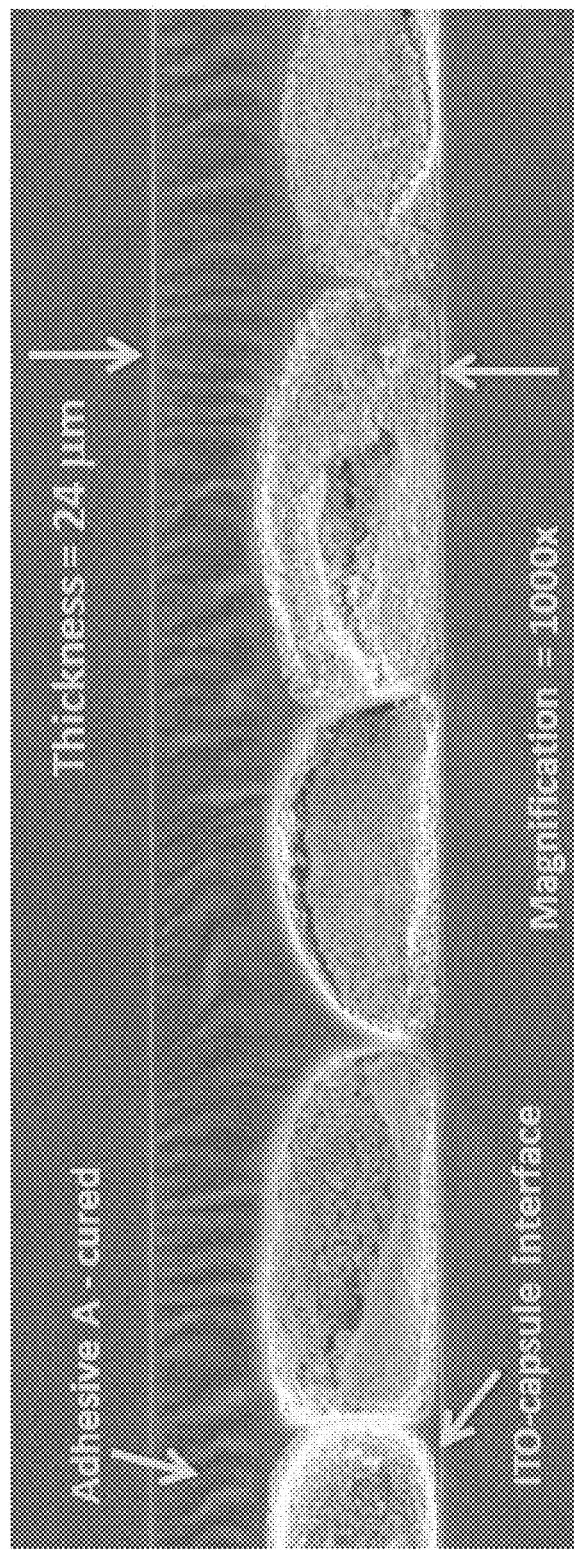
FIG. 14 is an SEM micrograph at 1000× magnification of an electrode/electro-optic layer/adhesive layer stack with a hybrid adhesive coated at 8 g/m$^2$, after curing.

Application of hybrid adhesive A was conducted by overcoating the adhesive fluid to open ink, drying in a heated oven (stage I cure), laminating a release substrate and subsequent stage II curing (chemical crosslinking) enabling the formation of an ink-adhesive coating layer that was relatively very thin (overall ink-adhesive thickness was about 23-24 microns) with a very low level of void defects. Corresponding commercial ink-adhesive coatings were approximately 40 microns thick. FIGS. 13-14 are SEM micrographs of a cross-section of a 2-layer ink-adhesive stack with hybrid adhesive A coated to 8 g/m2 (dry coat weight) demonstrating planarization and relatively defect free (voids) adhesive-ink interface and illustrating the overall thickness of the ink-adhesive coating layer. High temperature stress testing of a test glass display made from this front plane laminate (FPL) did not result in any defect formation confirming sufficient mechanical property development after stage II curing.

Example 23. Polyurethane Adhesive with Multiple Crosslinking Reagents

Figure 15:
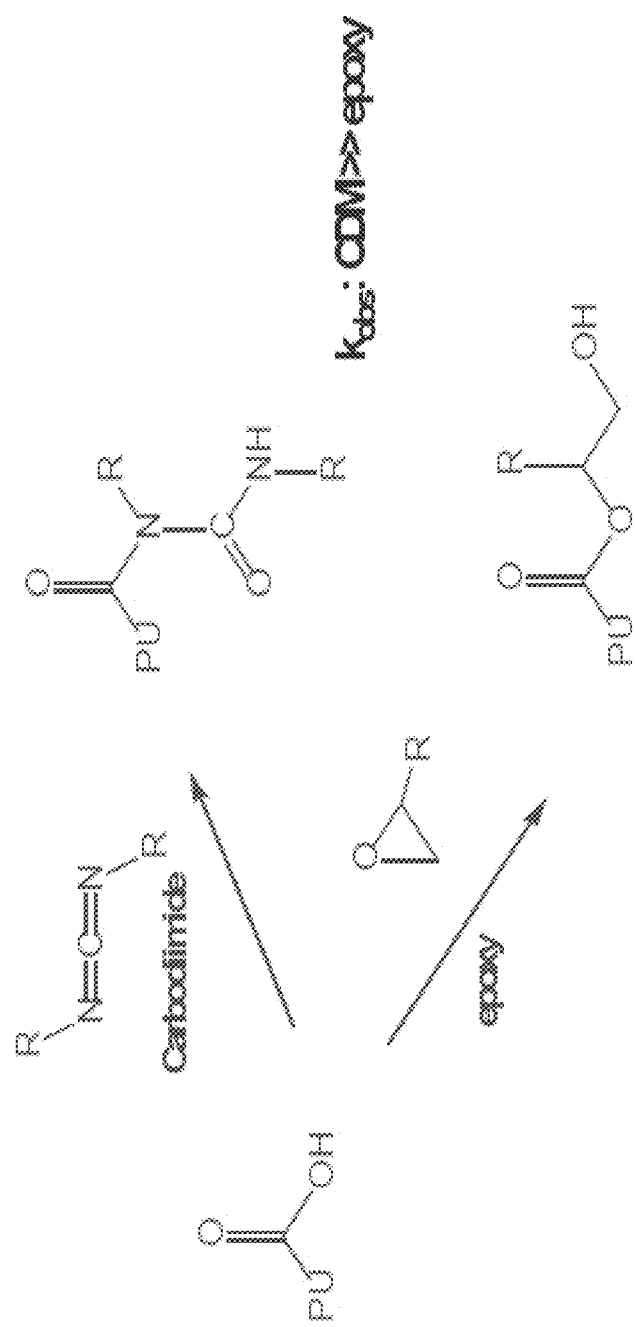
FIG. 15 shows exemplary schemes for reacting a polyurethane (PU) with crosslinkers.

In this example, a relatively low Tc polyurethane is combined with two different crosslinking reagents that differ in relative rates of crosslinking with reactive functionality on the polyurethane backbone. Stage I crosslinking was achieved during drying and lamination of adhesive application providing desirable rheology to enable subsequent processing steps. Stage II crosslinking largely occurred during the cure conditioning cycle of the FPL. For example, FIG. 15 illustrates the use of carbodiimide and epoxy crosslinkers with polyurethane (PU) that have significantly different crosslinking rates.

Figure 16:
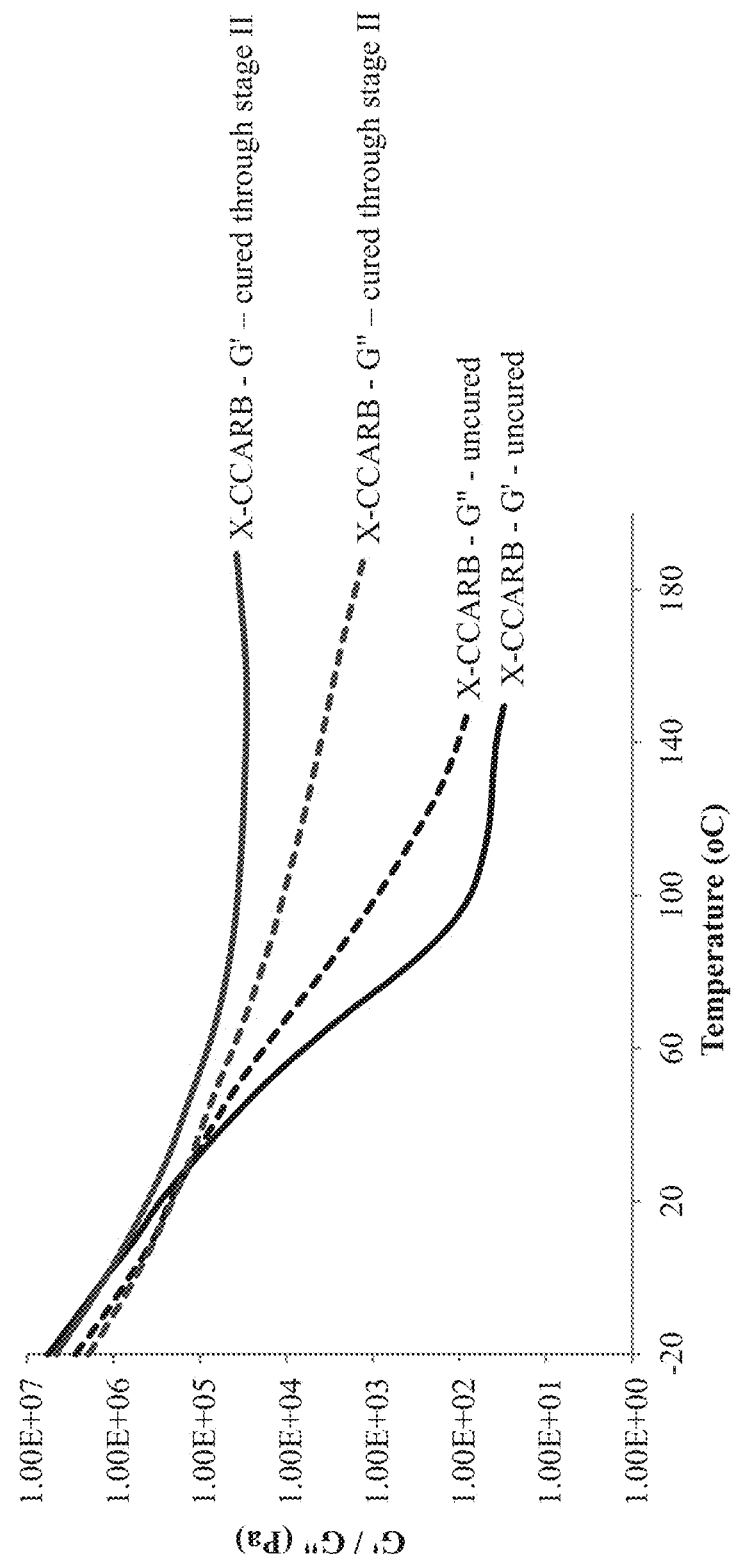
FIG. 16 is a plot of the Storage (G') and Loss (G") shear modulus curves at 1 Hz for uncured and cured (through stage II) cross-linked cyclic carbonate polyurethane (X-CCARB) adhesive.
Figure 17A:
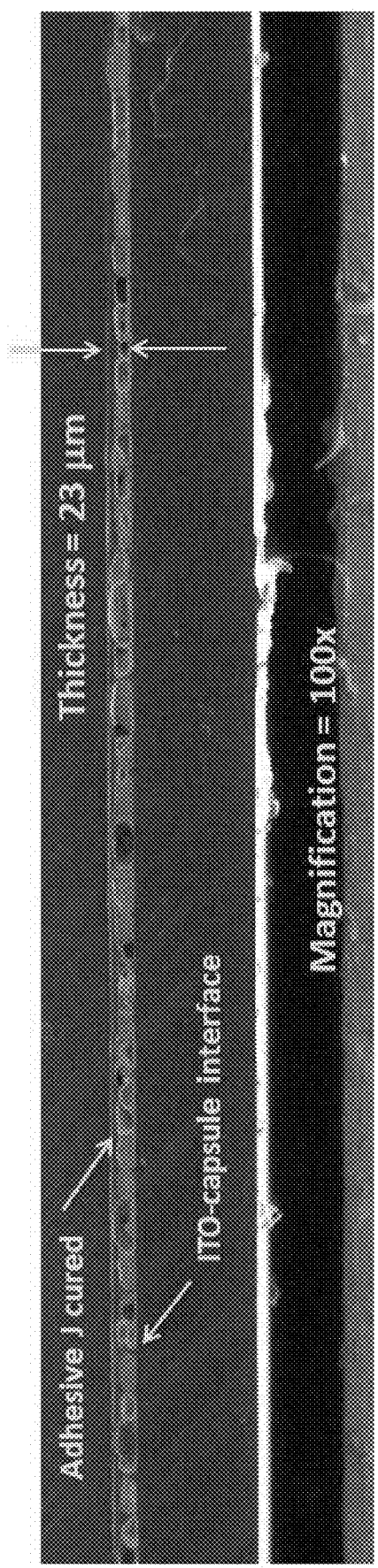
FIGS. 17A-17B are SEM micrographs at 100× and 1000× magnification, respectively, of electrode/electro-optic layer/adhesive layer stack with a cross-linked cyclic carbonate polyurethane coated at 7 g/m$^2$, after curing, illustrating that the overall thickness of the electro-optic layer is increased only minimally with the inclusion of the adhesive.
Figure 17B:
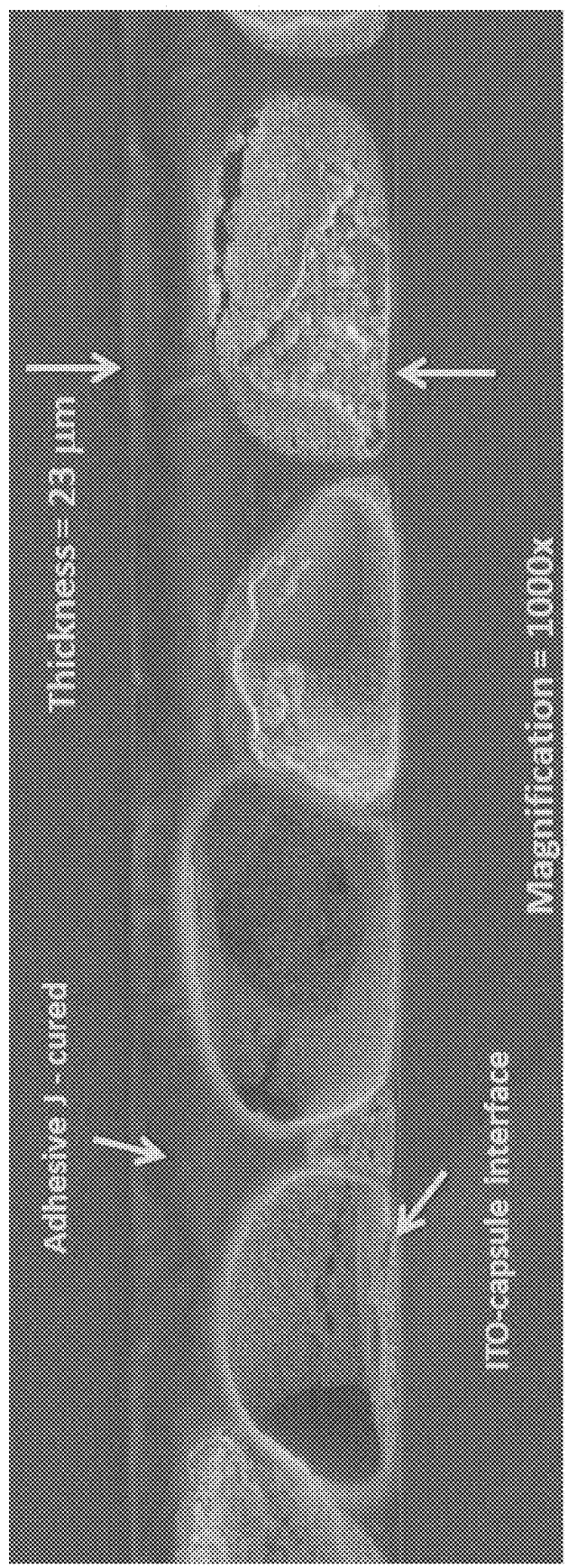

A polyurethane dispersion was mixed with 2 wt. % epoxy and 4.8 wt. % carbodiimide overcoated to open ink on PET-ITO, dried and laminated to a low surface energy release substrate. Curing of the carbodiimide crosslinker was relatively complete after the drying/lamination stage and curing of the epoxy crosslinker subsequently took place at 60 C over 5 days. The rheology profile of the adhesive system (Adhesive J) is plotted in FIG. 16. Both pre-cure and post-cure (through stage II) curves are illustrated. In FIG. 16, the shear storage modulus (G') and shear loss modulus (G") are plotted as a function of temperature. The combination of a high temperature plateau in the G', combined with a relatively low tan delta for the cured material demonstrates the efficiency of crosslinking. FIGS. 17A-17B are SEM micrographs of a cross-section of a 2-layer ink-adhesive stack with Adhesive J coated at 7 g/m$^2$ demonstrating planarization and relatively defect free (voids) adhesive-ink interface and illustrating the overall thickness of the ink-adhesive coating layer. High temperature stress testing of a test glass display made from this FPL did not result in any defect formation confirming sufficient mechanical property development after crosslinking.

Example 24. Dual Cure Adhesive with Two Cross-Linking Reagents

The following example demonstrates a dual cure incorporating two crosslinking-based cures.

The adhesive used a synthesis of a polyurethane dispersion with a mixture of end group monomers—Glycerin Carbonate/2-Hydroxyethyl pyrrolidone such as Adhesive J. The dual (covalent) crosslinking cure utilized the carboxylic acid functionality on the polyurethane to react with carbodiimide and epoxy crosslinkers. The following amounts of crosslinkers were used with Adhesive J:

Sample I: Sample I: 4.8 wt. % carbodiimide crosslinker (single cure)
Sample II: 8.0 wt. % carbodiimide crosslinker (single cure)
Sample III: 4.8 wt. % carbodiimide crosslinker+2.1 wt. % epoxy crosslinker (dual cure)
Sample 8.0 wt. % carbodiimide crosslinker+1.0 wt. % epoxy crosslinker (dual cure)

Using the methods described above, cross-linker consumption was monitored during Stage I curing (oven drying+ambient hold+hot lamination). The loss of carbodiimide functionality at ambient temperature for Samples I and II, after oven drying of the coated adhesive fluid, was plotted as a function of time. The ratio of carbodiimide peak area to CH peak area was then used to quantify the loss of carbodiimide. The residual level of carbodiimide after 2 hours is a function of the initial level of carbodiimide, but was relatively low in both samples. This illustrates that by the end of Stage I curing (oven drying ambient hold+hot lamination), essentially complete consumption of carbodiimide crosslinker has occurred, even at the higher of the two levels of carbodiimide, prior to Stage II curing.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations may depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All patent applications and patents incorporated herein by reference are incorporated by reference in their entirety. In case of conflict, the present specification, including definitions, will control. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

The indefinite articles "a" and "an," as used herein, unless clearly indicated to the contrary, should be understood to mean "at least one."

The phrase "and/or," as used herein, should be understood to mean "either or both" of the elements so conjoined, i.e. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e. the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element or a list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

The invention claimed is:

1. An electro-optic assembly comprising a hybrid adhesive layer, wherein the hybrid adhesive layer comprises two or more adhesive materials, wherein the two or more adhesive materials include a polyurethane adhesive material and a polyacrylate adhesive material, wherein the polyurethane adhesive material includes an end-capping cyclic carbonate of Formula (XII):

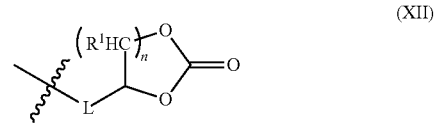

(XII)

wherein:
R$^1$ is selected from the group consisting of hydrogen, optionally substituted alkyl, optionally substituted heteroalkyl, optionally substituted aryl, optionally substituted heteroaryl, optionally substituted halide, and optionally substituted hydroxyl;
L is a linking group, optionally absent;
n is 1-4; and
∿∿∿ represents the location of a bond to the polyurethane.

2. The electro-optic assembly of claim 1, wherein L is optionally substituted alkylene or optionally substituted heteroalkylene.

3. The electro-optic assembly of claim 1, wherein R$^1$ is hydrogen.

4. The electro-optic assembly of claim 1, wherein the hybrid adhesive layer prior to curing has an average wet coat thickness between about 1 micron to about 100 microns.

5. The electro-optic assembly of claim 1, wherein the hybrid adhesive layer after curing has an average coat weight ranging between about 2 g/m$^2$ and about 25 g/m$^2$.

6. The electro-optic assembly of claim 1, wherein the polyurethane adhesive material further comprises a second type of end-capping group.

7. The electro-optic assembly of claim 6, wherein the second type of end-capping group comprises pyrrolidone of Formula (XVI):

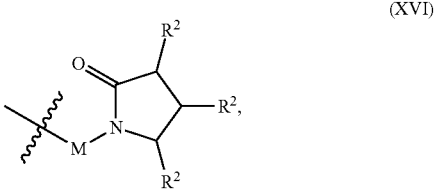

(XVI)

wherein:
each R$^2$ is the same or different and is selected from the group consisting of hydrogen, optionally substituted alkyl, optionally substituted heteroalkyl, optionally substituted aryl, optionally substituted heteroaryl;

M is a linking group, optionally absent; and

∿∿∿ represents the location of a bond to the polyurethane.

8. The electro-optic assembly of claim 7, wherein M is optionally substituted alkylene or optionally substituted heteroalkylene.

9. The electro-optic assembly of claim 1, wherein the polyurethane adhesive material is formed by reaction of a diisocyanate or polyisocyanate compound and at least one type of diol, polyol, diamine or polyamine.

10. The electro-optic assembly of claim 1, wherein the polyurethane adhesive material is formed by reaction of a diisocyanate compound and at least one type of diol, followed by reaction with a cyclic carbonate end-capping reagent.

11. The electro-optic assembly of claim 10, wherein the diisocyanate is 4,4'-methylenebis(cyclohexylisocyanate).

12. The electro-optic assembly of claim 1, wherein the end-capping cyclic carbonate is provided in a weight percent between about 2 wt. % and about 10 wt. % versus the polyurethane adhesive material not including any solvent.

13. The electro-optic assembly of claim 1, wherein the end-capping cyclic carbonate is provided at about 5-15 mole % of the polyurethane adhesive material.

14. The electro-optic assembly of claim 1, wherein the polyacrylic adhesive material is formed from a monomer selected from the group consisting of alkyl acrylate, alkyl methacrylate, epoxy acrylate, epoxy methacrylate, and mixtures thereof.

15. The electro-optic assembly of claim 14, wherein the alkyl acrylate monomer is butyl acrylate, or 2-ethylhexyl methacrylate.

16. The electro-optic assembly of claim 14, wherein the epoxy methacrylate monomer is glycidyl methacrylate.

17. The electro-optic assembly of claim 1, wherein the hybrid adhesive layer is formed by curing of the two or more adhesive materials under two different sets of conditions.

18. The electro-optic assembly of claim 17, wherein the polyacrylic adhesive material is cured via thermoplastic drying and the polyurethane adhesive material is cure via crosslinking with a reactive species of the polyacrylic material.

19. An electro-optic display comprising the electro-optic assembly of claim 1.

20. The electro-optic display of claim 19, wherein the electro-optic medium comprises an encapsulated electrophoretic medium.

* * * * *